(12) United States Patent
McCall

(10) Patent No.: US 11,662,057 B2
(45) Date of Patent: *May 30, 2023

(54) COLLAPSIBLE SUPPORT STRUCTURE FOR A REMOVABLE ELECTRONIC DEVICE HAVING A REMOVABLE BATTERY

(71) Applicant: Todd McCall, Trinity, FL (US)

(72) Inventor: Todd McCall, Trinity, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,327

(22) Filed: Feb. 3, 2021

(65) Prior Publication Data

US 2021/0172564 A1 Jun. 10, 2021

Related U.S. Application Data

(63) Continuation-in-part of application No. 16/989,409, filed on Aug. 10, 2020, now Pat. No. 10,941,898, which is a continuation-in-part of application No. 16/705,366, filed on Dec. 6, 2019, now Pat. No. 10,774,981.

(51) Int. Cl.
*F16M 11/00* (2006.01)
*F16M 11/28* (2006.01)
*F16M 11/04* (2006.01)

(52) U.S. Cl.
CPC ........... *F16M 11/28* (2013.01); *F16M 11/041* (2013.01); *F16M 2200/028* (2013.01)

(58) Field of Classification Search
CPC ....... F16M 11/041; F16M 11/28; F16M 11/10
See application file for complete search history.

(56) References Cited

U.S. PATENT DOCUMENTS

| | | | | |
|---|---|---|---|---|
| 9,851,625 B1* | 12/2017 | Fernandez | ................ | H02J 7/00 |
| 10,774,981 B1* | 9/2020 | McCall | .................. | F16M 13/04 |
| 10,941,898 B1* | 3/2021 | McCall | .................. | F16M 11/10 |
| 2008/0116270 A1* | 5/2008 | Wilson | .................. | G07C 13/00 |
| | | | | 235/386 |
| 2017/0318958 A1* | 11/2017 | Asante | ................. | A47B 13/023 |
| 2019/0187754 A1* | 6/2019 | Janzen | ............... | F16M 11/2021 |
| 2021/0310603 A1* | 10/2021 | Simon | .................... | F16M 11/42 |

* cited by examiner

*Primary Examiner* — Amy J. Sterling
(74) *Attorney, Agent, or Firm* — Tiffany C. Miller; Inventions International Inc.

(57) ABSTRACT

A collapsible support structure for a removable electronic device. The electronic device having a touch screen configured for a user to access at least one predetermined construction document and/or application is removably connected to the support structure. The electronic device may be retained in a housing configured to be water resistant and/or impact resistant. The support structure may have a locking mechanism configured for an authorized user to gain access to remove the electronic device from the support structure, thereby, preventing an unauthorized user from gaining access for removal of the electronic device from the support structure. The support structure is configured to be foldable in a closed orientation during storage. The support stand may have a plurality of casters connected to a base. The base has a removable battery connected to a charging system with an integrated uninterruptable power supply.

19 Claims, 20 Drawing Sheets

COLLAPSIBLE SUPPORT STRUCTURE FOR A REMOVABLE ELECTRONIC DEVICE HAVING A REMOVABLE BATTERY

CROSS REFERENCE TO RELATED APPLICATIONS

This application is a Continuation-In-Part Utility Application entitled, "Collapsible Support Structure For A Removable Electronic Device Having A Removable Battery", which claims priority to co-pending Continuation-In-Part Utility U.S. patent application Ser. No. 16/989,409 filed Aug. 10, 2020, entitled, "Collapsible Support Structure For A Removable Electronic Device", which claims priority to Original Non-Provisional Utility U.S. patent application Ser. No. 16/705,366 filed Dec. 6, 2019, entitled, "Collapsible Support Structure For A Removable Electronic Device".

BACKGROUND OF THE INVENTION

1. Field of the Invention

This invention relates, generally, to a collapsible support structure for a removable electronic device. More particularly, it relates to a support structure for an electronic device having a touch screen that is capable of receiving and locking an electronic device in position and being oriented in an upright orientation during use, as well as folding into a closed orientation during storage.

2. Background Art

Traditional methods of conducting construction productivity is organized by providing a user including, but not limited to, an engineer, a construction worker, a project team member, a code enforcement agent, an end user, or a building inspector, with information including, but not limited to, any construction document such as, a blueprint, instructions, or permit information. These construction documents are typically printed out and a courier delivers the construction documents to a job site. The status relating to any changes, amendments, additions, deletions, or updates to the construction documents are notated and delivered by courier to the receiving party, which can be time consuming and may delay project progress. Construction documents can be digitized Thus, there is a need for real-time, instant notification of the status of a plurality of construction documents associated with a construction related project, access to a plurality of construction documents associated with a construction related project, and ability to modify the plurality of construction documents for all users involved in the construction productivity of a construction project.

Currently, construction documents are accessed through the use of a user's personal electronic device such as a tablet having a touch screen or a smart phone having a touch screen. It may be difficult for a group or users to access and update or submit documents through the small size of a graphic user interface of a personal electronic device. Thus, there is a need for a construction kiosk having a graphic user interface of a touch screen capable of being viewed and accessible to a group of users at a construction site. Further, it would be more desirable for the electronic device having a touch screen to be removably connected to the kiosk stand so that the electronic device may be placed on a table during use as well. In addition, a kiosk stand having a locking mechanism configured to maintain a fixed connection between the kiosk stand and the electronic device would prevent tampering or theft of the electronic device from the construction site.

Some construction documents are accessed through a computer placed inside of a rolling steel toolbox at a construction site. The problem with this existing construction productivity method is the bulkiness of the toolbox, which inhibits the ease of transporting the electronic documents from each construction site. It would be more desirable for the supporting stand of the electronic device to be foldable to a closed orientation that is compact for easy transport. Further, the computer of current methods located on the toolbox often gets damaged when exposed to the elements such as rain, snow, sunlight, or construction debris. This there is a need for the electronic device to have a protective barrier. Finally, a computer placed on a toolbox is susceptible to theft because of the lack of securing means to secure the computer onto the toolbox. Thus, there is a need for a novel locking mechanism capable of preventing unauthorized removal of the electronic device from its supporting structure.

Currently, mobile kiosks may be positioned at a site that does not have an external and/or remote power source such as at a new build construction site. A mobile kiosk configured to receive at least one removable battery allows for a user to operate the mobile kiosk at many more locations compared to other kiosks seen in today's market that are required to be in electrical communication with a wall outlet. Further, a mobile kiosk with a battery backup having an uninterruptable power supply (UPS) incorporated within the battery system provides power when there is a power cut or failure. For example, the electronic device being supported by the collapsible support of the kiosk having a UPS will continue to run before a proper shutdown is initiated, as a forced shutdown could adversely affect the electronic device resulting in inconvenience, component failure, and/or loss of data.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a novel collapsible support structure for a removable electronic device. The electronic device having a touch screen configured for a user to access at least one predetermined construction document and/or application is removably connected to the support structure. The electronic device may be retained in a housing configured to be water resistant and/or impact resistant. The support structure may have a locking mechanism configured for an authorized user to gain access to remove the electronic device from the support structure, thereby, preventing an unauthorized user from gaining access for removal of the electronic device from the support structure. The support structure is configured to be foldable or collapsible in a closed orientation during storage. The support stand may have a plurality of casters connected thereto. This novel invention also includes improvements that overcome the limitations of prior art collapsible support structures for an electronic device and is now met by a new, useful, and non-obvious invention.

The novel collapsible support structure for a removable electronic device has an electronic device having a touch screen. It is within the scope of this current invention for the electronic to have a touch screen or to not have a touch screen such as a traditional computer. The electronic device is in electrical communication with a power source. It is within the scope of this invention for the electronic device to be connected to a power source including, but not limited to, a battery or a remote power source such as the computer having an electric cord plugged into an outlet. The support structure has a first end located opposite a second end. It is within the scope of this invention for the electronic device to have a bracket and to be removably connected to the support stand and then positioned on a table, a tool box, a tool box lid, or on a portion of a vehicle or a tool box truck.

The electronic device is removably connected to the first end of the support structure. It is within the scope of this invention for at least a portion of the electronic device to have a bracket connected thereto. The bracket may be removably connected to a corresponding capturing structure connected to the first end of the support structure. A locking mechanism may lock the bracket of the electronic device within the capturing structure of the support structure, thereby, preventing unauthorized removal of the electronic device from the support structure. It is within the scope of this invention for the locking mechanism to be any locking mechanism including, but not limited to, mechanical, digital, fingerprint, combination, or lock and key.

The support structure has a base having a first side located opposite a second side. The first side of the base is connected to the second end of the support structure. It is within the scope of this invention for the base to be configured to anchor the support structure in an upright orientation and to prevent the support structure from tilting over when the electronic device is being used. The base may have an opening. The opening of the base can have finger grips configured to receive the hand of a user. The opening of the base may be grasped by a user when the support structure is hingedly pivoted in a closed position. The opening of the base may be grasped by a user during transportation of the device, a user may carry the collapsible support structure with the aid of the opening of the base.

The support structure can have a locking mechanism having a first portion and a second portion. The electronic device has a first portion of the locking mechanism. The first end of the support structure has a second portion of the locking mechanism. The first portion of the locking mechanism and the second portion of the locking mechanism are configured to connect to form a locked orientation, whereby, the locked orientation is configured to prevent an unauthorized user from removing the electronic device from the support structure.

In an alternate embodiment, the second end of the base is connected to a plurality of casters or rollers. The device may be rolled by a user from a first location to a second location without having to pick the unit up from the ground. It is within the scope of this invention for the base to have a weight ballast, at least one handle, attachment means for support structure pieces, a mounting surface configured to receive at least a portion of the support structure, or rollers.

In yet another embodiment, it is within the scope of this invention for the base of the collapsible support structure to have a removable battery system with an uninterruptible power supply (UPS). By incorporating a UPS, power is applied to a load when the input power source or mains power fails to protect the electronic device during unexpected power disruption which may result in business disruption and/or data loss. The UPS system includes but is not limited to, on-line, line-interactive, and standby, whereby, surge protection and backup are basic features offered to protect the electronic device when it is connected to incoming utility power. In an example, when incoming voltage meets a threshold value, the UPS is actuated to activate its internal DC-AC inverter circuitry powered from internal battery storage. Next, the UPS mechanically switches the electronic device to DC-AC inverter output. A multivariable-voltage autotransformer configured to increase or decrease powered coils of wire in an attempt to increase or decrease the magnetic field and the output voltage of the transformer. As a result, the USP may be configured to withstand continuous undervoltage brownouts and/or overvoltage surges without power consumption of reserve battery power by automatically selecting differing power taps of the autotransformer.

In a preferred embodiment, the electronic device has at least one predetermined application or construction document. The application is configured to be accessible to a user through a graphic user interface of the touch screen of the electronic device. It is envisioned that the at least one predetermined application is installed onto the electronic device by an administrator or programmer. For example, a manager overseeing a construction project may only want the employees to have access to a permit portal and sketches. The manager may want to prohibit the employees from making unauthorized searches from an internet browser on the novel collapsible support structure for a removable electronic device. Thus, the manager has identifying credentials which permit access to program the at least one predetermined application or construction document.

In another alternate embodiment, the electronic device is retained in a housing. The housing has a transparent portion oriented to overlay said touch screen of the electronic device. The housing may be impact resistant. The housing may be water resistant. The transparent portion of the housing is configured to allow a user to operate the touch screen while installed on the electronic device.

The support structure is hingedly pivotable to a foldable orientation. The support structure is configured to be oriented in a folded position when the support structure is hingedly pivoted in a closed configuration. The support structure is configured to be oriented in an upright position when the support structure is hingedly pivoted in an open configuration.

In another embodiment, the support structure is slidably traversable or configured to be telescoped to extend an open length. The support stand can have a plurality of pieces that can be removably assembled onto an end of each other to form an upright, open orientation. The plurality of support stand pieces may be disassembled by a user and stored by being connected to the base when not in use. It is within the scope of this invention for the support stand to include, but not be limited to, a collapsible post.

In yet another embodiment, a collapsible support structure for a removable electronic device has an electronic device. The electronic device has a touch screen. A mounting bracket has a first side located opposite a second side. The mounting bracket can have handles located along the outer perimeter edge of the mounting bracket. The first side of the mounting bracket retains a removable electronic device. The second side of the mounting bracket has a first anchoring structure. The first anchoring structure is hingedly pivotable to adjust the electronic device in an upright position when in use. The electronic device is in electrical communication with a power source. The collapsible support structure has a first portion and a second portion. It is within the scope of this invention for the collapsible support structure to have a plurality of collapsible portions such as a first, second, and a third portion to adjust the height of the electronic device.

The first portion of the collapsible support structure has a first wall having an opening configured to receive at least a portion of the first anchoring structure. When at least a portion of the first anchoring structure is retained within the opening of the first wall, the mounting bracket and electronic device are oriented in a user-friendly position that is easily accessible to a user during use. In particular, the mounting bracket and electronic device are positioned at an angled distance away from the first portion of the support structure during use. When the first anchoring structure is removed from the opening of the first wall, the mounting bracket and electronic device lay flat and/or parallel to the first wall of the first portion of the support structure during storage when not in use. The first wall is connected to a first side wall having a first flange located opposite a second side wall having a second flange. The first portion of the collapsible support structure has a first end located opposite a second end. The first end of the first portion of the collapsible support structure has a capturing structure connected to the mounting bracket of the electronic device. The second end of the first portion of the collapsible support structure has at least one opening located on the first flange and/or the second flange. This opening is configured to be received by a locking pin. When this opening is aligned with a locking pin, the support structure is locked into an open configuration during use. The locking pons may be released or removed from the openings to then allow the support structure first portion and second portion to slide into one another in a closed and/or nested configuration during storage.

It is within the scope of this invention for a third portion of the support structure to have the same structure as the first portion and second portion to the extent to which the flanges of the third portion have openings configured to receive a locking pin and the third portion would be slidable into the second portion while receiving the first portion during storage. The second portion of the collapsible support structure has a first end located opposite a second end. The first end of the second portion of the collapsible support structure has at least one locking pin. The locking pin is configured to be grasped by a user to release connection between a first portion and a second portion of the support structure. The connection is the locking pin being retained by an opening of the flange of a portion of the support structure. The first end of the second portion of the collapsible support structure receives the second end of the first portion of the collapsible support structure. At least one locking pin of the second portion of the collapsible support structure is received by at least one opening of the first flange and/or second flange of the first portion of the collapsible support structure.

The base has a first side located opposite a second side. The first side of the base has a second anchoring structure. The purpose of this second anchoring structure allows the anchoring structure to be hingedly pivotable to collapse the support structure when being folded into a closed configuration during storage or to be hingedly pivotable in an open configuration to help support the support structure to maintain an upright orientation during use. The second anchoring structure has a first end located opposite a second end. The second anchoring structure is hingedly pivotable at the first end. At least a portion of the second end of the second anchoring structure is removably connected to the second portion of the collapsible support structure. The first side of the base has a protrusion. The second portion of the collapsible support structure is hingedly connected to the protrusion of the base. The first and second anchoring structures both serve as key structures for an improved collapsible support structure. In particular, the set-up of the support structure to an upright open configuration requires the first and second anchoring structures to engage and/or contact the collapsible support structure while in use. When the support structure is collapsed during storage, the first and second anchoring structures will disengage and/or disconnect from the support structure to allow the portions of the support structure to simultaneously fold and the portions of the support structure to nest into each other during storage.

The first portion of the collapsible support structure is retained within the second portion of the collapsible support structure when in an unassembled or closed orientation. The first portion and the second portion of the collapsible support structure both overlay the base in a nested orientation when in a closed orientation. A key feature of the plurality of portions of the support structure is their chamber capable of receiving a subsequent portion of support structure. This can only be accomplished is the size of the portion of the support structure connected to the mounting bracket is the smallest in size and the portions of the support structure ascending in size towards the base. The largest portion of the support structure will be connected to the base because this portion of the support structure will need to have a chamber great enough in size to retain all of the other portions of the support structure when collapsed during storage. The electronic device and mounting bracket overlay the first portion and the second portion of the collapsible support structure when oriented in a closed configuration.

The first side of the base has a handle having a first end located opposite a second end. The first end of the handle is configured to be grasped by a user. The second end of the handle has an opening. The opening of the second end of the handle is configured to receive a fastener such as a screw. The fastener is configured to anchor the handle to the base so that the handle can rotate at the fastener in an opened or closed orientation. It is within the scope of this invention for the second end of the handle to have a locking mechanism in which a locking pin is aligned with an opening of the second end of the handle. The locking pin is engaged by an opening of the base to prevent rotation of the handle when the locking pin is engaged. When the locking pin is removed from the opening, the handle portion is free to rotate to an open or closed orientation.

It is within the scope of this invention for the second side of the base to be connected to a plurality of casters. It is within the scope of this current invention for the electronic device to have at least one predetermined application. The application is configured to be accessible to a user through a graphic user interface of the touch screen of the electronic device.

It is within the scope of this current invention for the base to have at least one radiused portion.

It is within the scope of the current invention for a barrier member to be removably connected to the corners of the mounting bracket when an electronic device is retained within the mounting bracket. The barrier member protects the electronic device from the force of being impacted by surrounding environmental, accidental, and/or damage factors during use and/or during storage.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
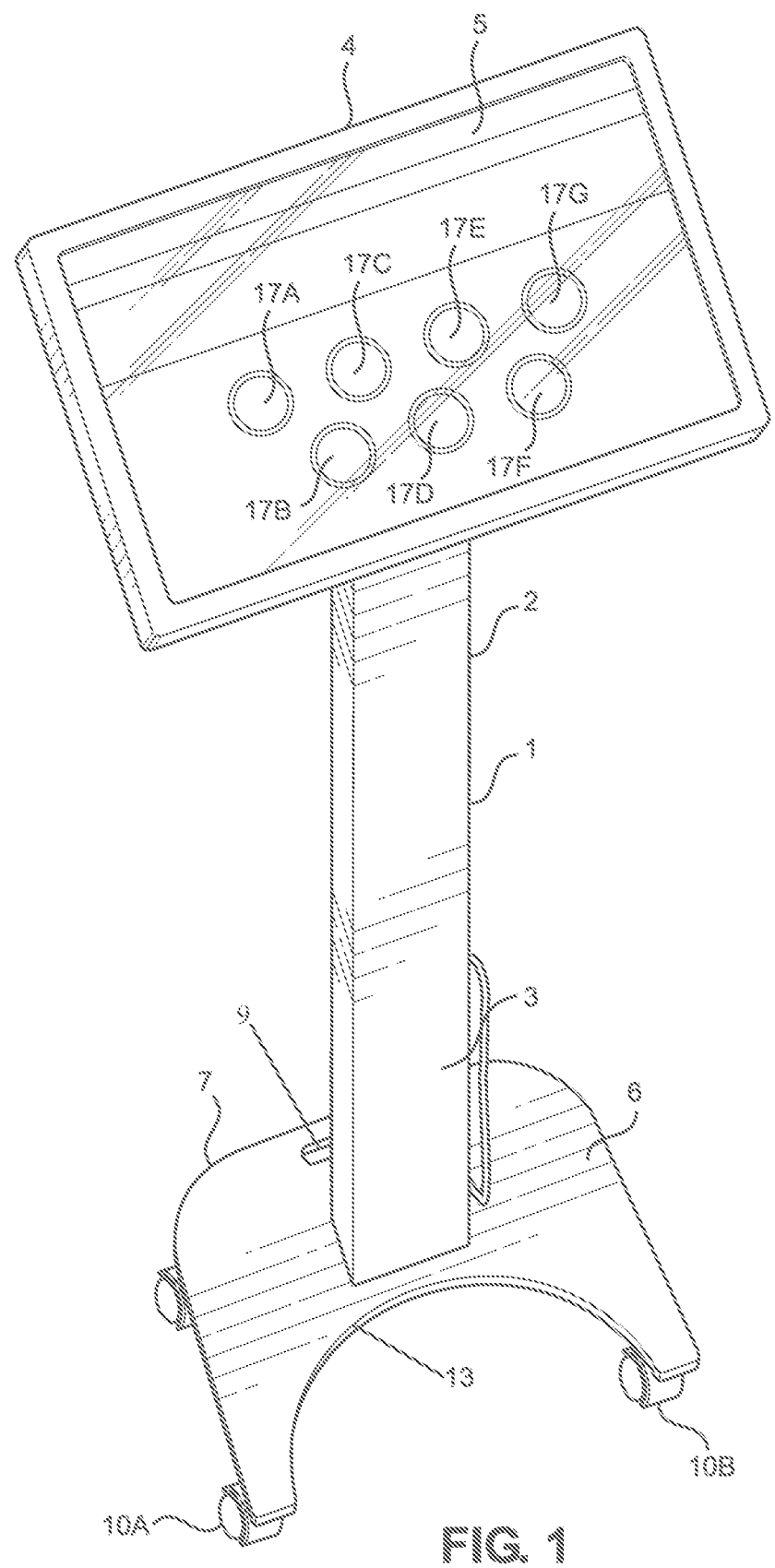
FIG. 1 is a front perspective view of the support structure for an electronic device having a touch screen.
Figure 2:
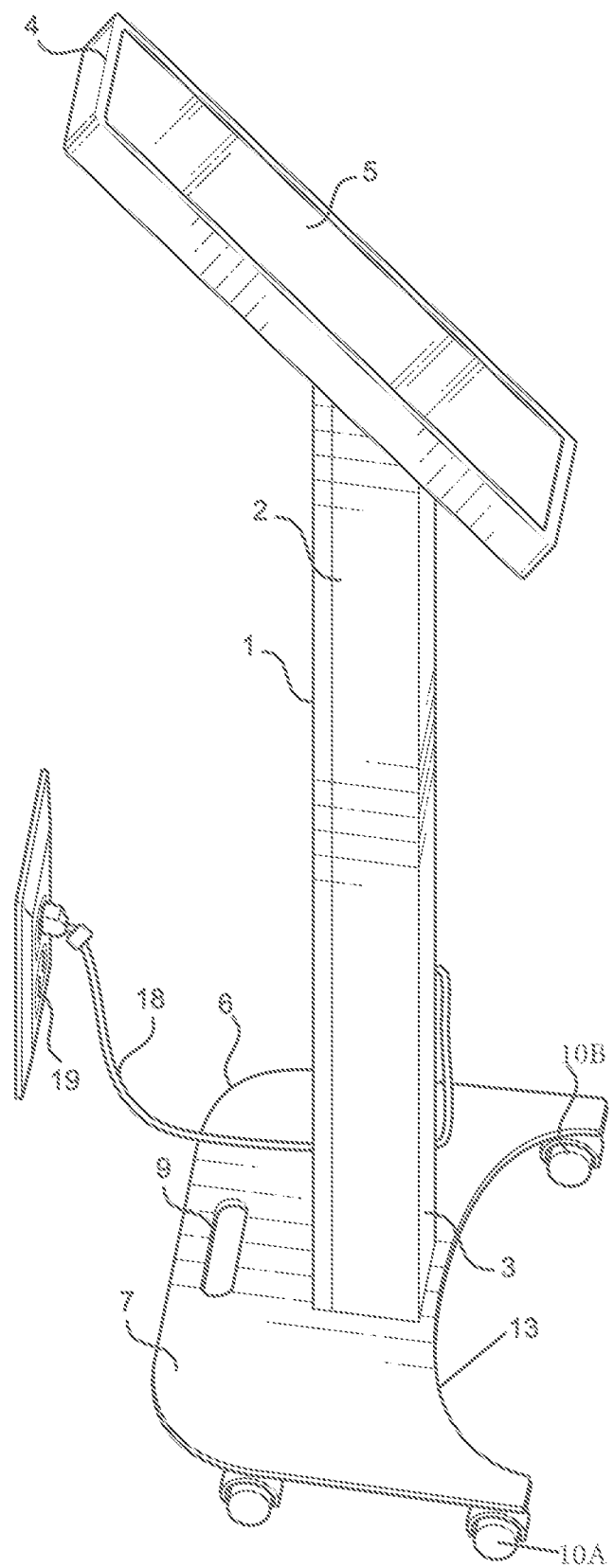
FIG. 2 is a side perspective view of the novel support structure for an electronic device having a touch screen.
Figure 3:
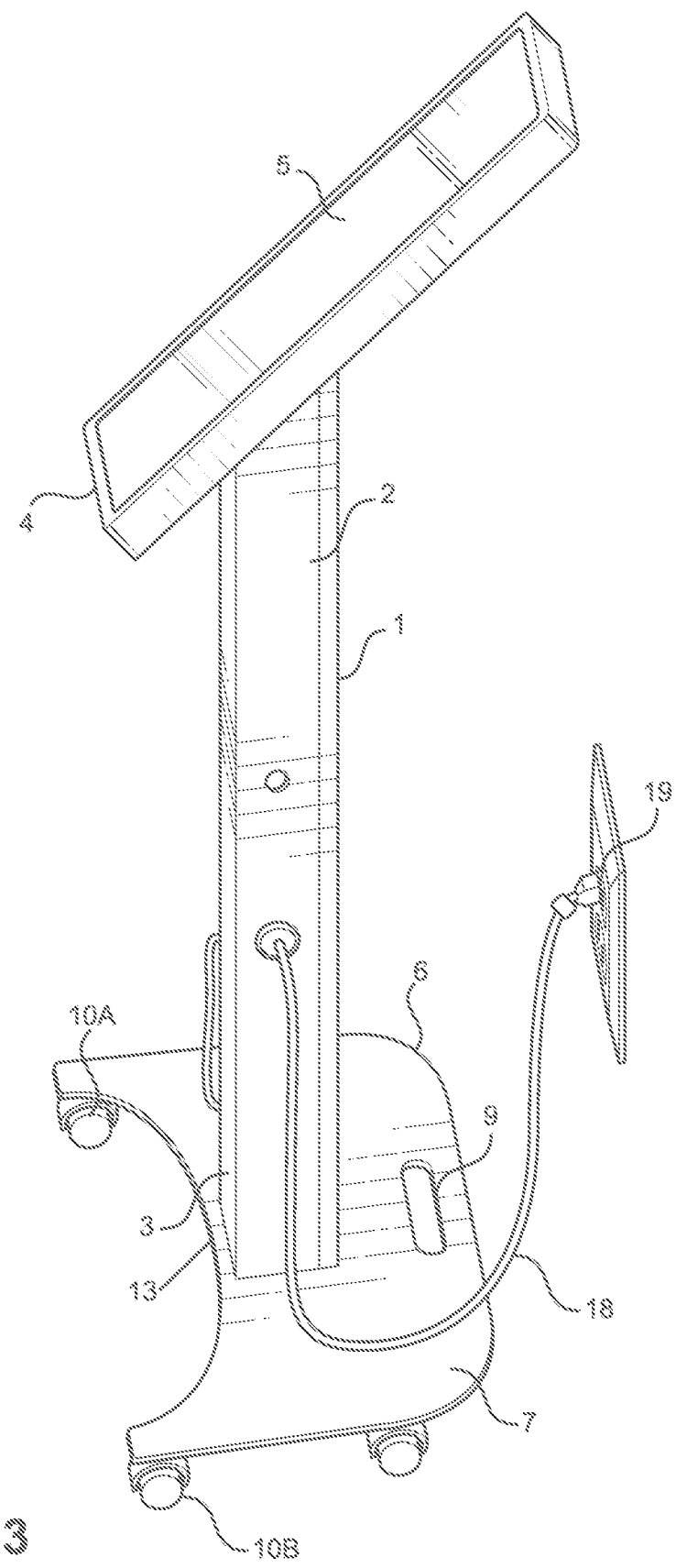
FIG. 3 is a side perspective view of the novel support structure for an electronic device having a touch screen.
Figure 7:
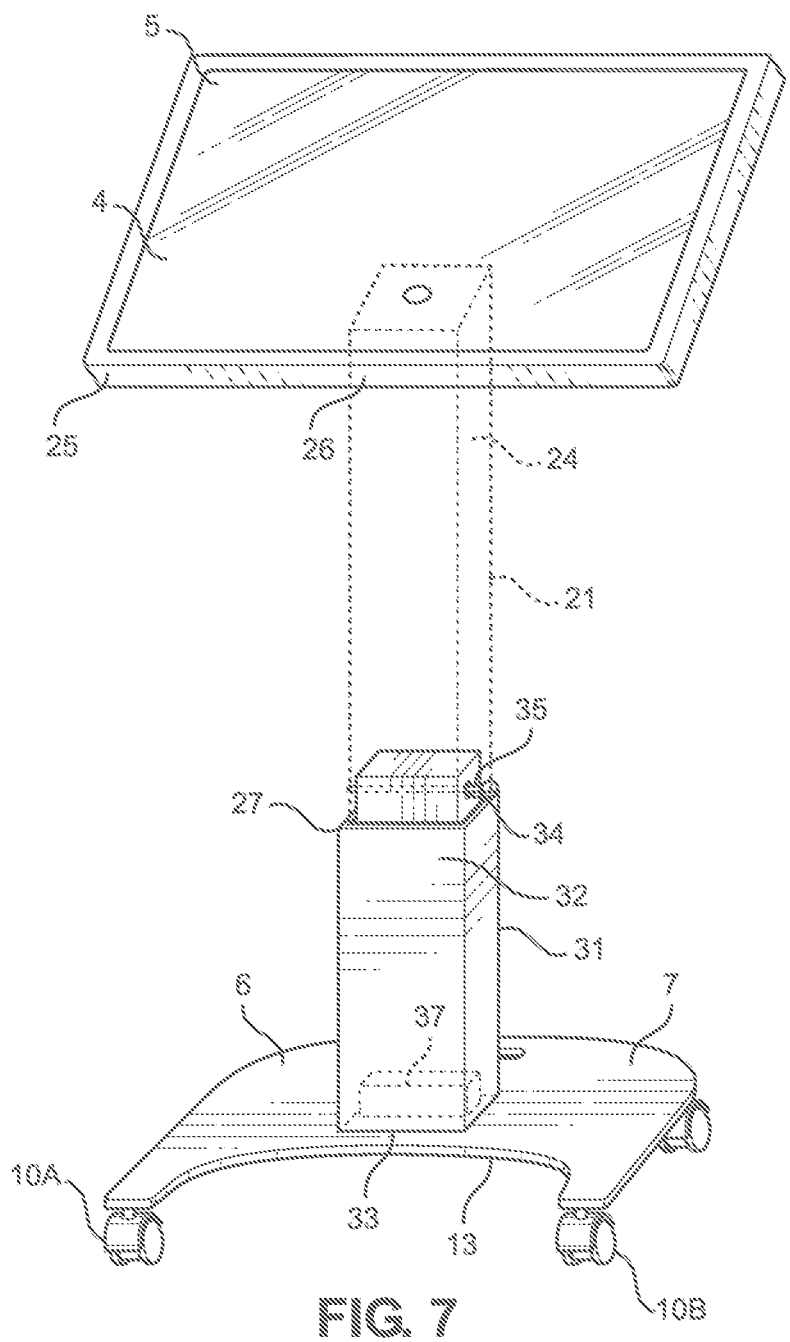
FIG. 7 is a front perspective cut away view of the electronic device connected to a portion of a collapsible support structure in an open configuration.
Figure 8:
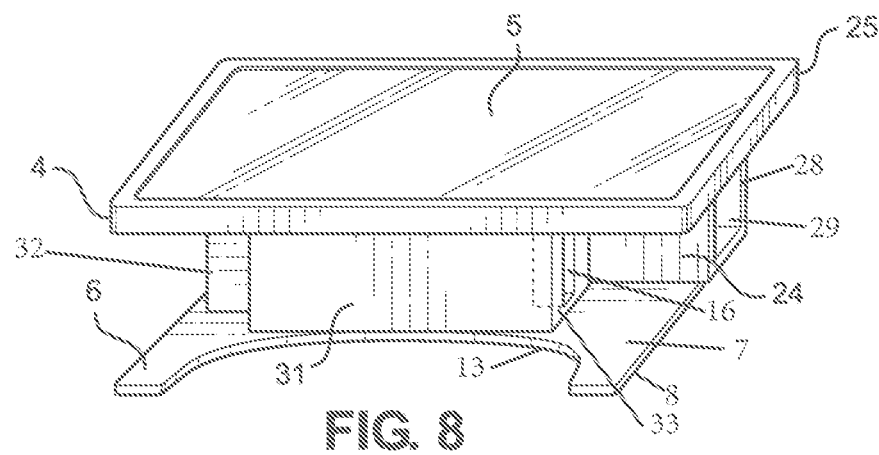
FIG. 8 is a perspective view of novel support structure for an electronic device having a touch screen in a closed orientation with the collapsible support structure stored on the base.

It will now be seen, referring to FIGS. 1-4, novel support structure 1 for electronic device 4 has touch screen 5 (FIGS. 1-3). FIG. 1 best illustrates touch screen 5 having application icons 17A-17F such as different construction related apps configured for a user to activate through the graphic user interface of touch screen 5. It is within the scope of this invention for a programmer to program a predetermined selection of desirable apps that are to be accessible to the users of electronic device 4. FIGS. 1-3 illustrate support structure 1 having first end 2 located opposite second end 3 of support structure 1. Second end 3 of support structure 1 is connected to first side 7 of base 6. Base 6 has radius portion 13 (FIGS. 1-3, 6-10) configured to make room for a user's feet while a user is operating electronic device 4. Base 6 can have opening 9 which serves as a handle portion for a user to grasp with their hand during transport. Base 10 can have a plurality of rollers or casters 10A-10B (FIGS. 1-3, 6-7, 9-10), 10C and 10D (FIG. 10) connected thereto. FIG. 8 illustrates an embodiment in which base 6 does not have casters connected thereto.

FIGS. 2-3 illustrate support stand 1 having electrical cord 18 connected thereto. At least one end of electrical cord 18 is connected to an opening of support stand 1 and connects with circuitry of electronic device 4 to power electronic device 4. The other end of electrical cord is connected to wall outlet 19. It is within the scope of this invention for electronic device 4 to be charged or replenished with any power source including, but not limited to, solar power, a remote power source, or battery power.

Figure 4:
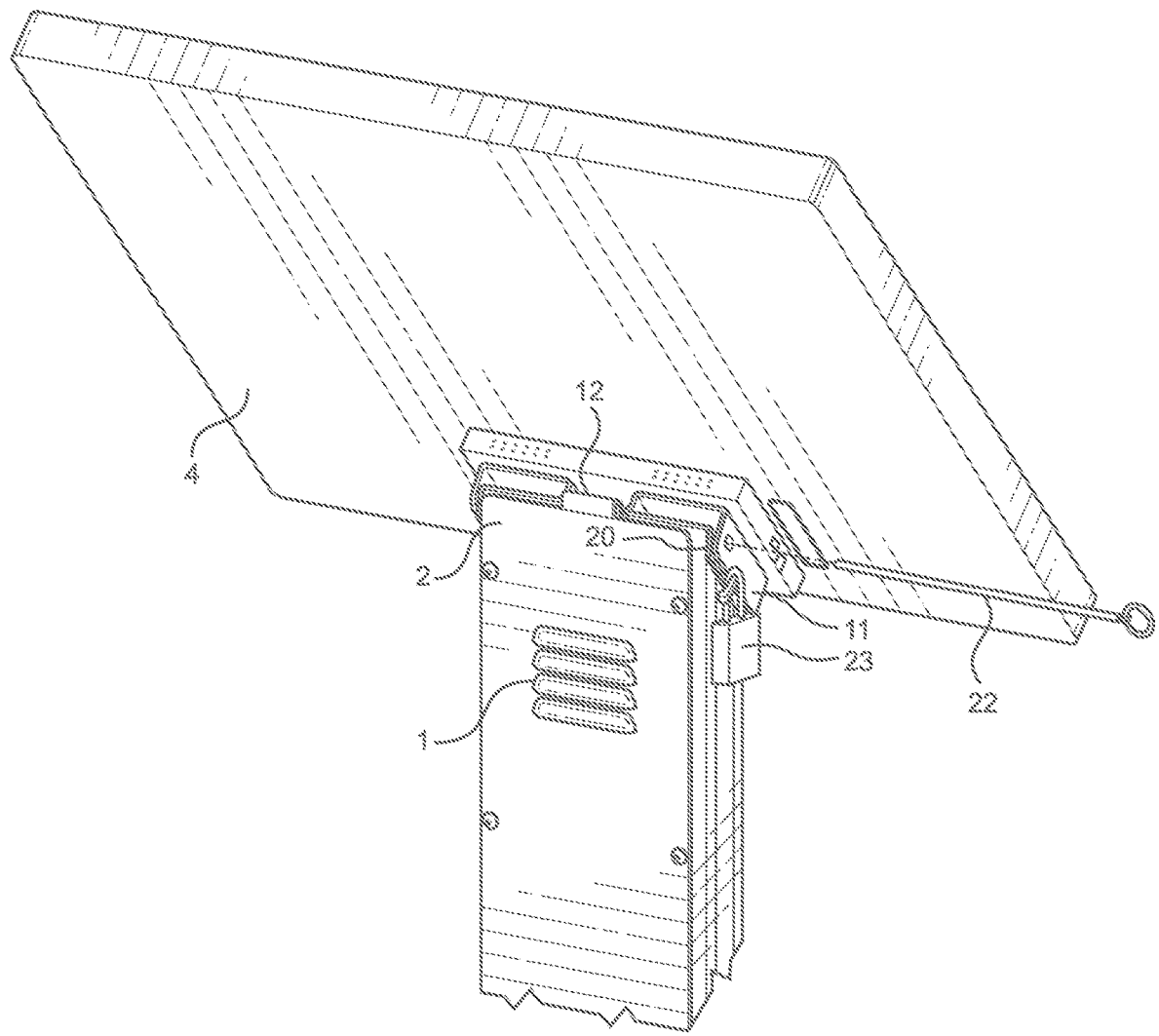
FIG. 4 is a partial rear perspective view of the bracket of the electronic device connected to the capturing structure of the first end of the support structure.
Figure 5:
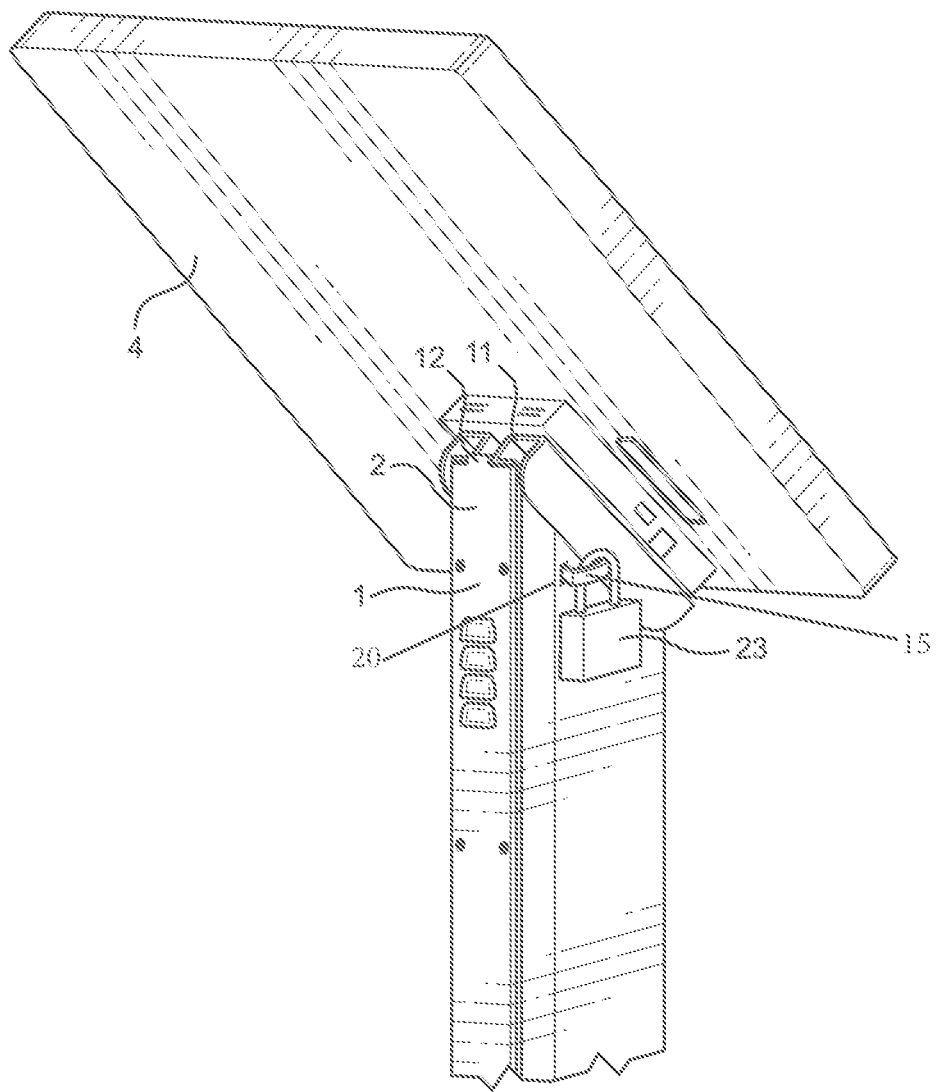
FIG. 5 is a partial rear perspective view of the bracket of the electronic device connected to the capturing structure of the first end of the support structure.
Figure 6:
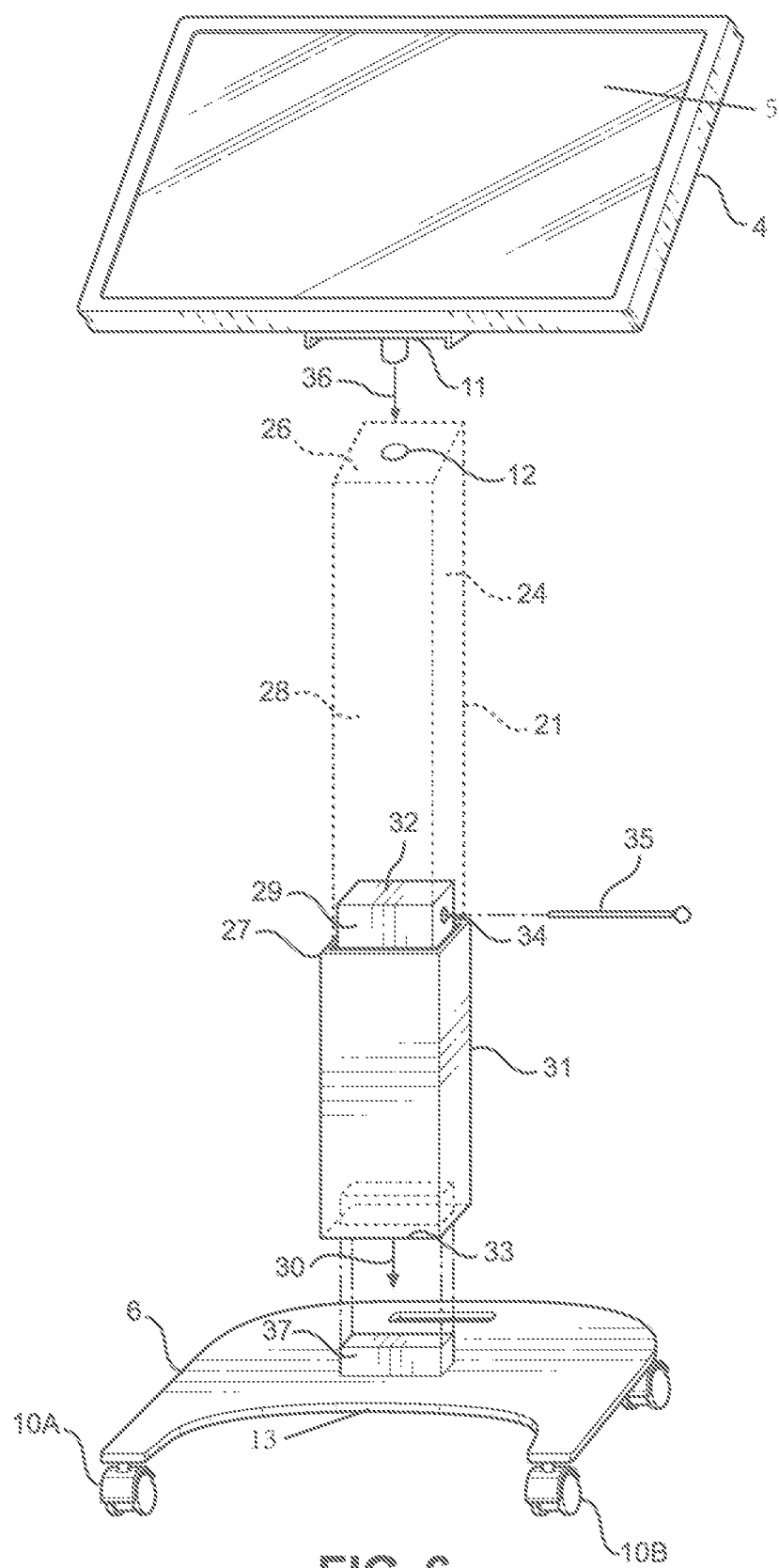
FIG. 6 is an exploded cut away view of the electronic device connected to a portion of a collapsible support structure in an open configuration.

FIGS. 4-5 illustrate first end 2 of electronic device 4 has capturing structure 12. Capturing structure 12 removably connects to bracket 11 of electronic device 4. It is within the scope of this invention for capturing structure to include, but not be limited to, a latch, a hook (FIGS. 4-5), or an opening 12 (FIG. 6). Bracket 11 has a side connected to rear portion of electronic device 4 located opposite another side removably connected to capturing structure 12. Capturing structure 12 is located on first end 2 of support structure 1. Lock mechanism 20 is pad lock 23 connecting bracket 11 of electronic device 4 to support structure 1. FIG. 4 illustrates an embodiment in which locking mechanism 20 can be lock pin 22 positioned through an opening of bracket 11 of electronic device 4 and through opening of either support structure 1 or through an opening of capturing structure 12. FIG. 5 shows locking mechanism 20 having protruding portion 15 receiving at least a portion of padlock 23. It is within the scope of this invention for locking mechanism to include, but not be limited to, any locking mechanism such as mechanical, digital, or fingerprint lock.

FIG. 6 illustrates electronic device 4 having touch screen 5. Bracket 11 (FIG. 6) is connected to electronic device 4. At least a portion of bracket 11 is retained by capturing structure being opening 12. Bracket 11 is removably connected 36 to first end 26 of first portion 24 of telescoping support structure 21. FIGS. 6-7 illustrate telescoping support structure 21 having a first portion 24 and second portion 31. First portion 24 of telescoping support structure 21 has a hollow chamber 28. First portion 24 of telescoping support structure 21 has first end 26 located opposite second end 27. Chamber 28 of first portion 24 of telescoping support structure 21 has chamber opening 29 receiving at least a portion of first end 32 of second portion 31 of telescoping support structure 21. Second portion 31 of telescoping support structure 21 has first end 32 located opposite second end 33 (FIG. 6, 8-10). Second end 33 of telescoping support structure 21 is removably connected 30 to base 6. In particular, as illustrated in FIGS. 6-7, base 6 may have mounting surface being a protruding portion 37 (FIGS. 9-10) configured to be received by an opening 16 (FIGS. 8-9) of second end 33 of second portion 31 of telescoping support structure 21.

Referring now to FIGS. 6-7, telescoping support structure 21 has locking mechanism being locking pin 35 received by opening 34 located on both first portion 24 and second portion 31 of telescoping support structure 21. Locking pin 35 may be completely removable, depressed, or spring actuated to engage a corresponding opening of telescoping support structure 21. Electronic device 4 is retained within a water-resistant housing 25 (FIG. 8). Telescoping or collapsible support stand is oriented in an open configuration when in use.

Figure 9:
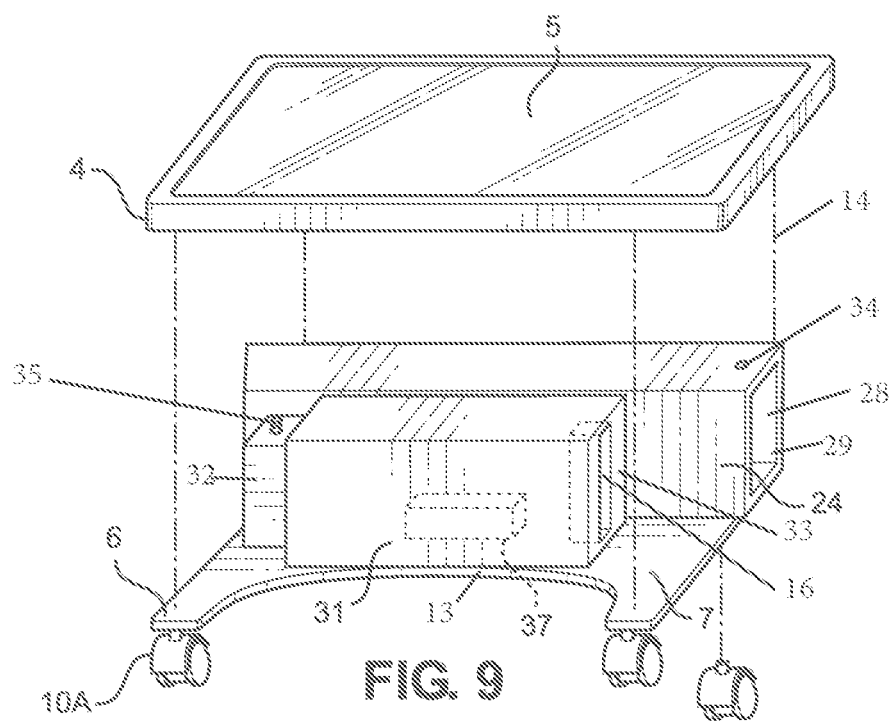
FIG. 9 is an exploded view of novel support structure for an electronic device having a touch screen in a closed orientation with the collapsible support structure stored on the base.

FIGS. 8-9 illustrate first portion 24 having chamber opening 29 bordering chamber 28 and second portion 31 of collapsible stand 21 oriented in a closed position during storage and when not in use. Chamber opening 29 of first portion 24 of collapsible support structure receives first end 32 of second portion 31 of collapsible support structure. Second portion 31 of collapsible support structure has first protruding end 32 located opposite recess 16. Recess 16 receives protrusion 37 (FIGS. 9-10) of base plate 6. Electronic device 4 has touch screen 5. During storage first portion 24 of collapsible support structure 21 and second portion 31 of collapsible support structure 21 may connect to first side 7 of base 6. Base has second side 8 (FIG. 8) located opposite side 7 of base 6.

Figure 10:
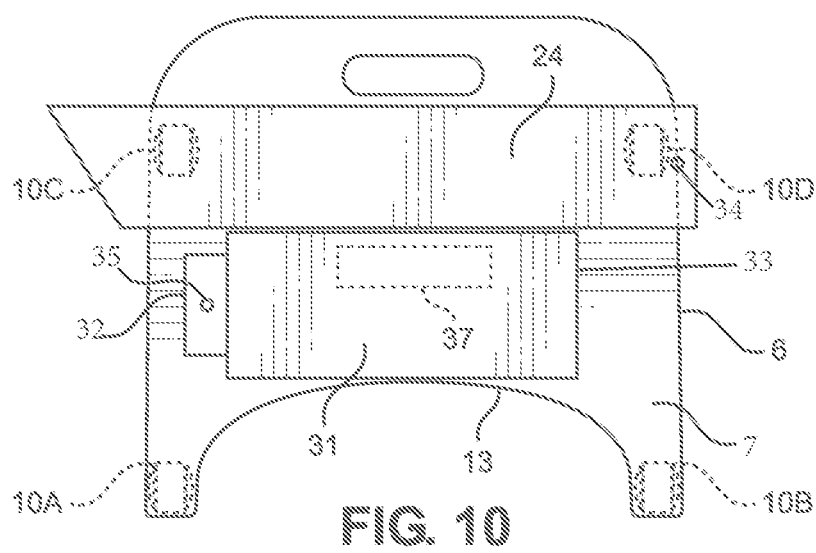
FIG. 10 is a top view of novel support structure in a closed orientation with the collapsible support structure stored on the base.

FIGS. 9-10 show first end 32 of second portion 31 of collapsible support structure having a locking pin configure to be depressed and to be received by opening 34 of first portion 24. FIG. 9 illustrates electronic device 4 overlaying 14 the stored support structures 24 and 31 when oriented in a closed orientation during storage.

Figure 11:
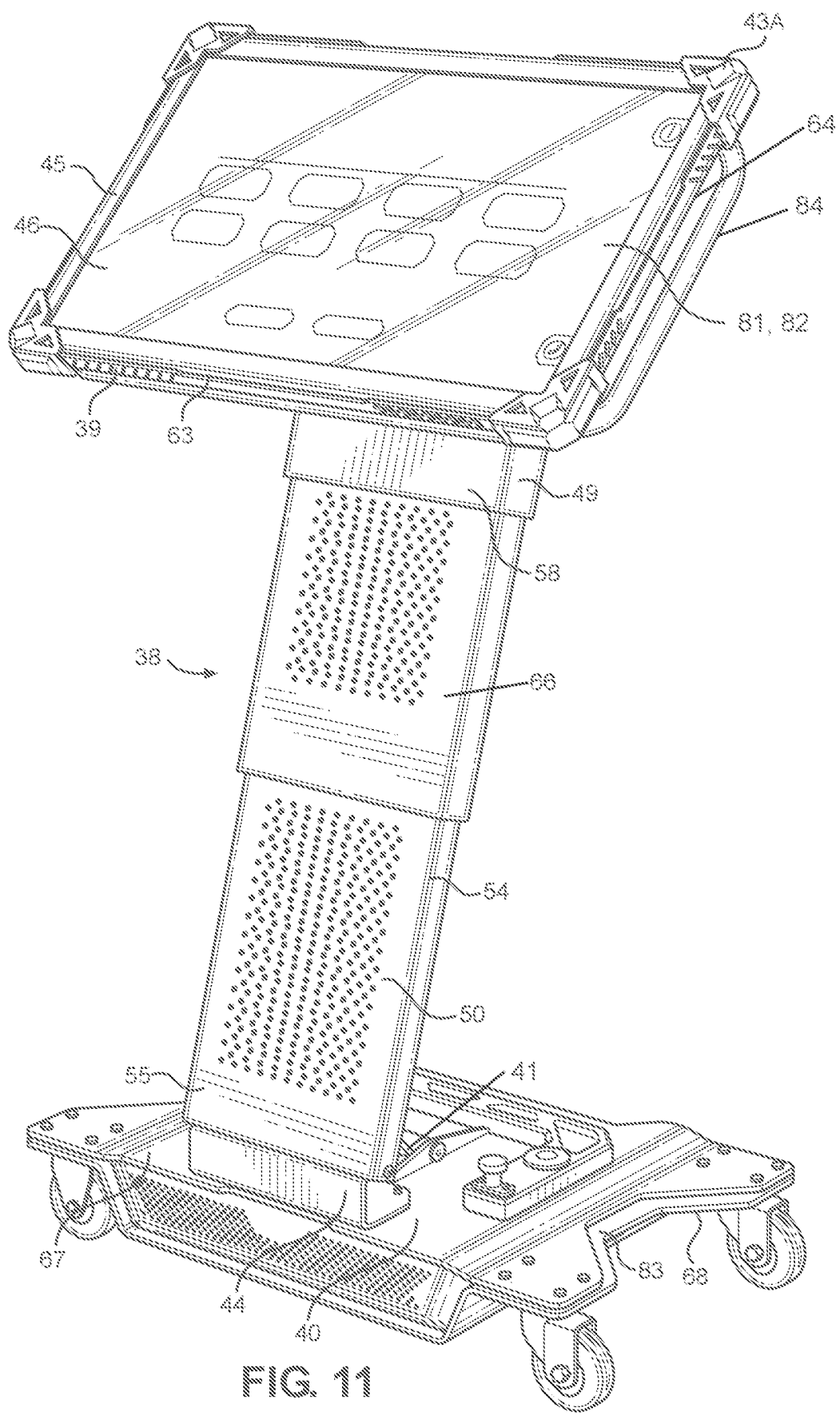
FIG. 11 is a front perspective view of an alternate embodiment of a novel support structure for an electronic device having a touch screen in an open orientation.
Figure 13:
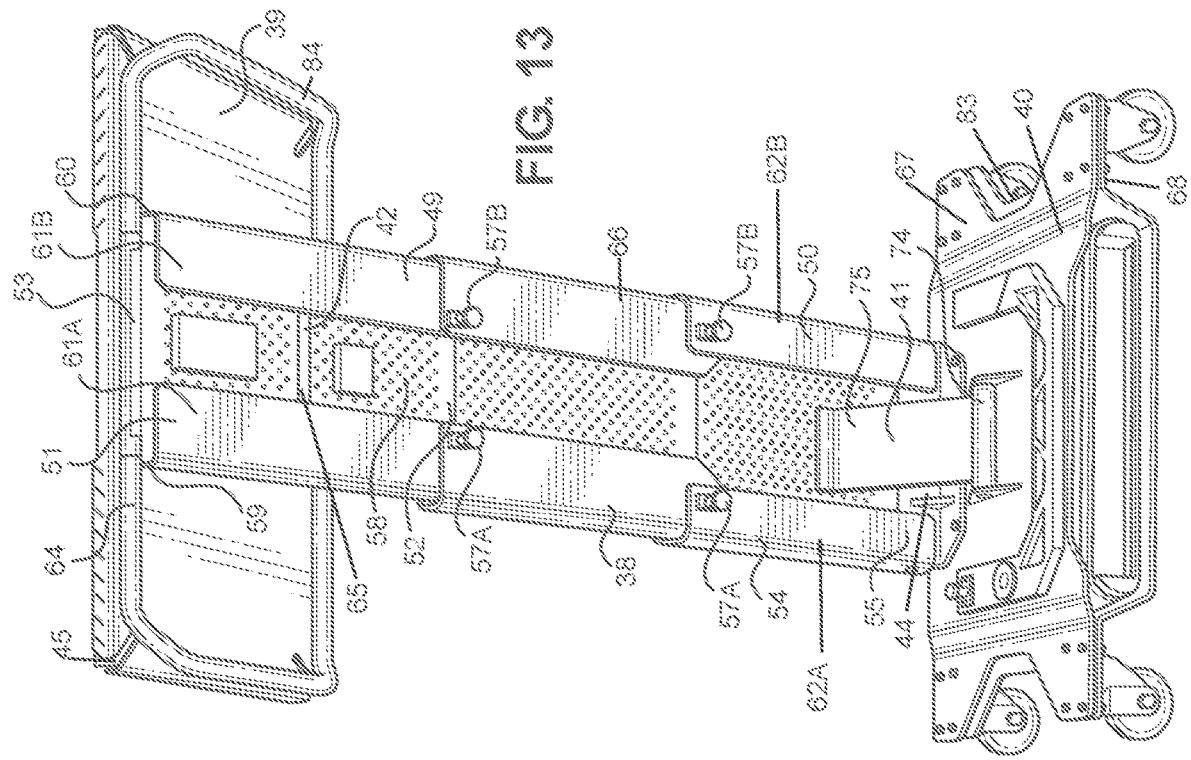
FIG. 13 is a rear perspective view of an alternate embodiment of a novel support structure for an electronic device having a touch screen in an open orientation with a first pivotable hinge connected to the base.
Figure 14:
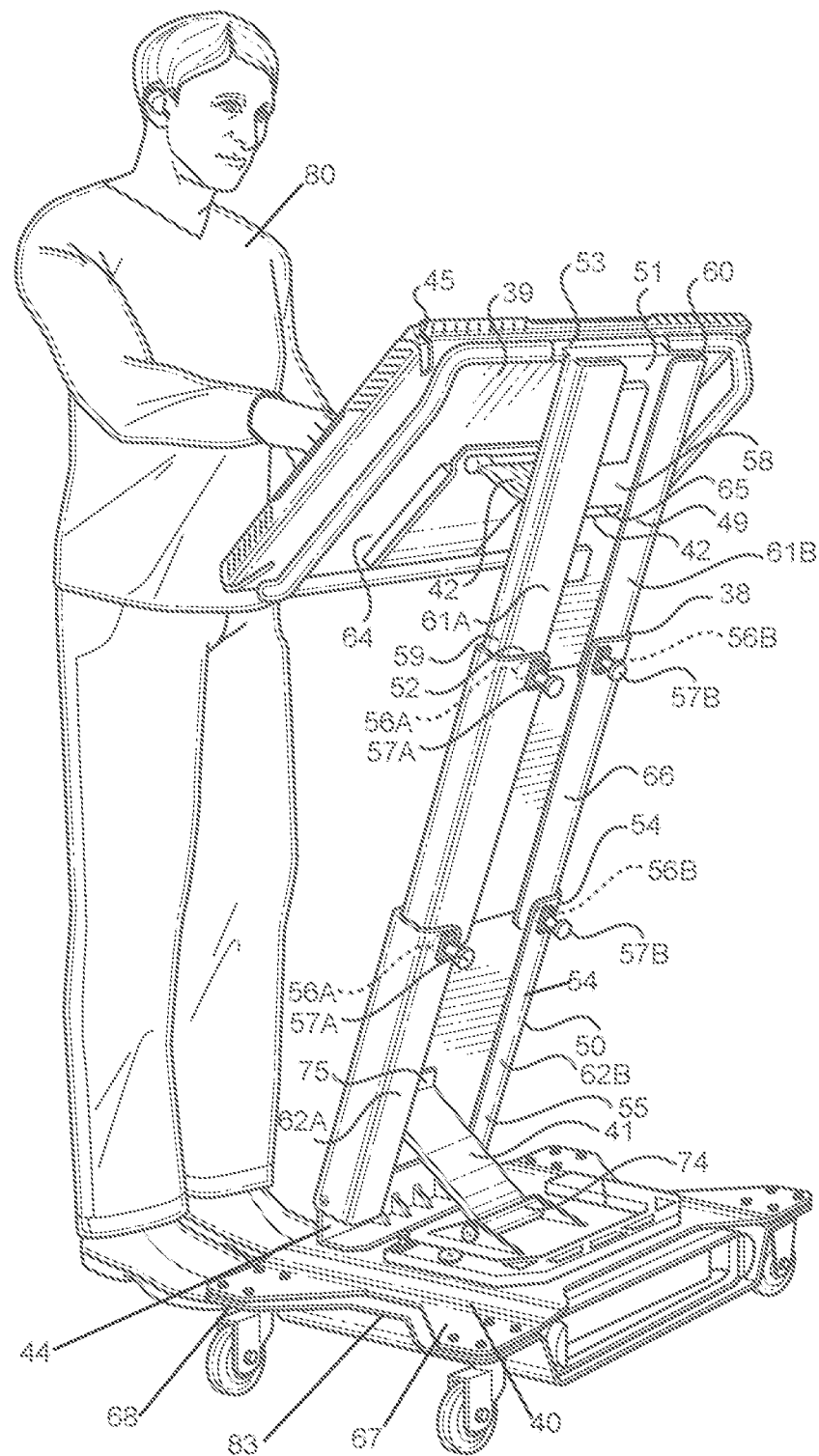
FIG. 14 is a rear perspective view of an alternate embodiment of a novel support structure for an electronic device having a touch screen in an open orientation with a first pivotable hinge connected to the base and a second pivotable hinge connected to the mounting bracket.

FIGS. 11-20 show differing views of a preferred embodiment of novel collapsible support structure 38 having an improved collapsible structure 38 for quick and compact storage when not in use. Referring now to FIG. 11, collapsible support structure 38 for removable electronic device 45 has touch screen 46. Mounting bracket 39 has first side 63 located opposite second side 64 (FIGS. 13, 14). First side 63 of mounting bracket 39 is configured to retain electronic device 45. Collapsible support structure 38 has first portion 49 and second portion 50. Electronic device 45 has at least one predetermined application 82 configured to be accessible to a user 80 (FIG. 14) through graphic user interface 81 of touch screen 46 of electronic device 45. FIG. 11 shows first portion 49 of collapsible support structure 38 having first wall 58.

Figure 19:
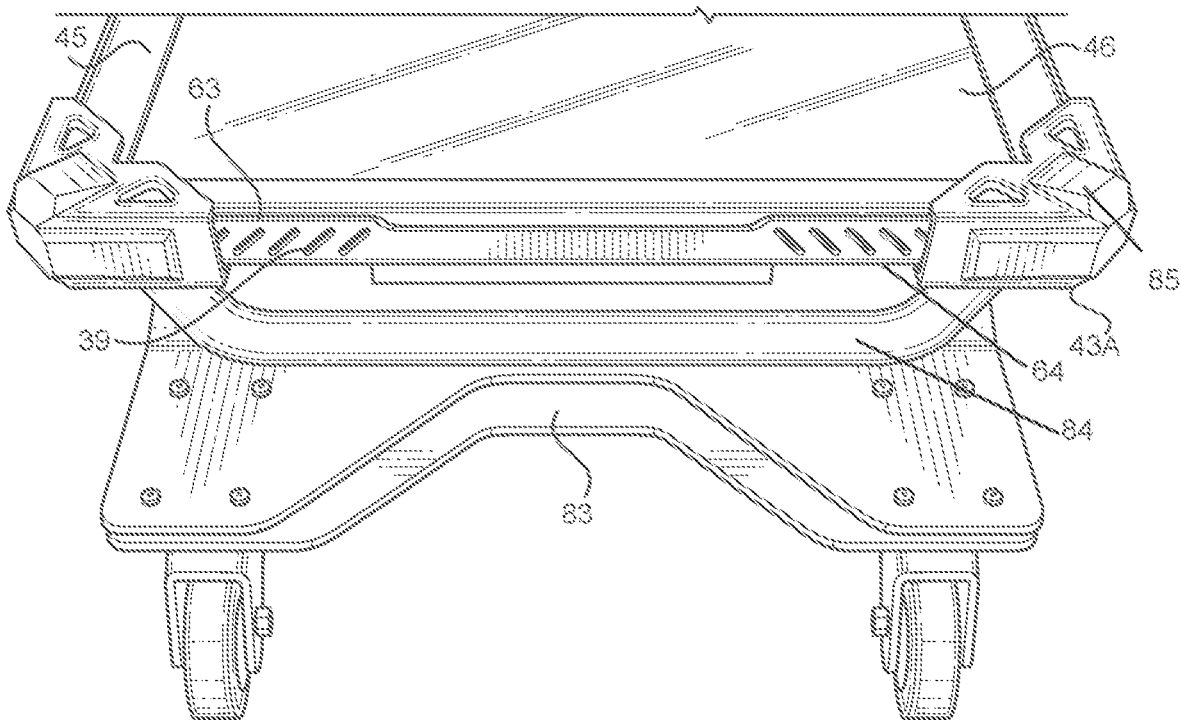
FIG. 19 is a partial view of an alternate embodiment of a novel support structure for an electronic device having a touch screen in a closed orientation with a barrier member connected to the corners of the mounting bracket; and, FIG. 20 is a partial view of an alternate embodiment of a novel support structure for an electronic device having a touch screen in a closed orientation with a barrier member connected to the corners of the mounting bracket.

FIGS. 11 and 19 show mounting bracket 39 having at least one removable barrier member 43A connected thereto, whereby, removable barrier member 43A is connected to at least one corner of mounting bracket 39 when electronic device 45 is retained within mounting bracket 39. Mounting bracket 39 may have at least one ramped portion to function as a bumper guard in protecting the electronic device 45 from getting damaged such as preventing touch screen 46 from becoming cracked.

FIGS. 13 and 14 show first portion 49 of collapsible support structure 38 having first wall 58. First wall 58 has opening 65 configured to receive at least a portion of first anchoring structure 42. First wall 58 is connected to first side wall 59 having first flange 61A located opposite second side wall 60 having second flange 61B. First portion 49 of collapsible support structure 38 has first end 51 located opposite second end 52. First end 51 of first portion 49 of collapsible support structure 38 has capturing structure 53 connected to mounting bracket 39 of electronic device 45. As best shown in FIG. 14, second end 52 of first portion 49 of collapsible support structure 38 has at least one opening 56A located on first flange 61A and/or at least one opening 56B located on second flange 61B. It is within the scope of this invention for first portion 49 of collapsible support structure 38 to be received by third portion 66 or by second portion 50.

Figure 12:
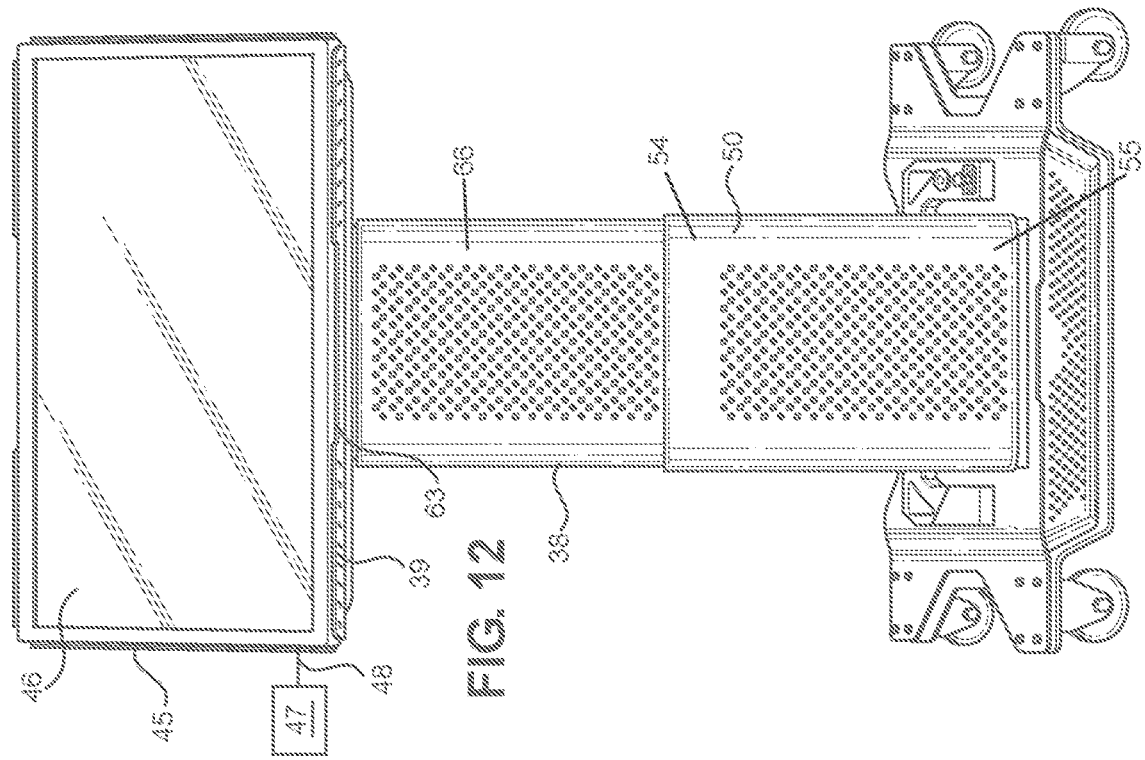
FIG. 12 is a front perspective view of an alternate embodiment of a novel support structure for an electronic device having a touch screen in an open orientation.

FIG. 12 illustrates collapsible support structure 38 with mounting bracket 39 having first side 63 retaining electronic device 45. Electronic device 45 has touchscreen 46. Electronic device 45 is in electrical communication 48 with power source 47. Electrical communication 38 includes, but is not limited to, any electrical connection either wired and/or wireless. Power source 47 includes, but is not limited to, a battery, alternating current, and/or direct current.

FIGS. 11, 13, 19-20 show second side 64 of mounting bracket 39 having handle 84 located on the outer perimeter of mounting bracket 39. Handle 84 is configured to be grasped by a user and pulled upward to expand collapsible support structure 38 into an open configuration (FIGS. 11-14, 17-18) when in use. It is within the scope of this invention for collapsible support structure 38 to have a plurality of portions such as third portion 66 having openings 56A (FIG. 14) and 56B (FIG. 14) in the flanged portions to receive lock pin 57A and 57B. Third portion 66 (FIGS. 11-14) has the feature of extending the height of collapsible support structure 38 and can be positioned between first portion 49 and second portion 50 and secured in place with a fastener including, but not limited to, a locking pin 57A-57B.

FIG. 14 shows collapsible support structure 38 having second side 64 of mounting bracket 39 having first anchoring structure 42. First anchoring structure 42 is hingedly pivotable.

FIGS. 11, 12, 13, and 14 depict second portion 50 of collapsible support structure 38 having first end 54 located opposite second end 55. FIGS. 13 and 14 show first end 54 of second portion 50 of collapsible support structure 38 having at least one locking pin 57A and 57B. First end 54 of second portion 50 of collapsible support structure 38 receives second end 52 of either third portion 66 or first portion 49 of collapsible support structure 38. At least one locking pin 57A and 57B of second portion 50 of collapsible support structure 38 is received by at least one opening 56A (FIG. 14) and/or 56B (FIG. 14) of first flange 62A and/or second flange 62B of first portion 49 and/or third portion 66 of collapsible support structure 39.

FIGS. 11, 13, 14, and 15 show base 40 having first side 67 located opposite second side 68. Base 40 has at least one radiused portion 83 to enhance stability of collapsible support structure 38. It is within the scope of this invention for a power supply to be retained within base 40. Second side 68 of base 40 is connected to a plurality of casters 79A-7 (FIG. 16). First side 67 of base 40 has second anchoring structure 41 (FIGS. 11, 13, 14). FIGS. 13 and 14 show second anchoring structure 41 having first end 74 located opposite second end 75. Second anchoring structure 41 is hingedly pivotable at first end 74. At least a portion of second end 75 of second anchoring structure 41 is connected to second portion 50 of collapsible support structure 38. First side 67 of base 40 has protrusion 44. Protrusion 44 is unique in that is has a substantially L-shaped structure. Protrusion 44 has a portion connected to base 40 and another portion connected to second portion 50 of collapsible support structure 38. A key feature of L-shaped protrusion 44 or L-bracket is that second portion 50 can easily pivot at the hinge point to fold down during storage or to pivot upward at hinge point to fold upward during use. When second portion 50 is hingedly pivoted upward, second anchoring structure 41 can engage second portion 50 to lock it in place so it does not pivot during use.

FIGS. 11, 13, 14, 15, and 16 show the separate portions of the collapsible support structure 38 are slidable into one another because the top most portion, the first portion 49 has capturing structure 53 connected to mounting bracket 39. First side 63 of mounting bracket 39 retains electronic device 45 having touchscreen 46. First portion 49 of collapsible support structure 38 has the smallest size so that it can slidably be retained within third portion 66. Third portion 66 is smaller in size than second portion 50 and third portion 66 is slidably retained within second portion 50. Second portion 50 of collapsible support structure 38 is hingedly connected to protrusion 44 of base 40. Referring now to FIGS. 11, 13, 14, 17, and 18, second anchoring structure 41 has first end 74 located opposite second end 75. When second anchoring structure 41 is hingedly pivoted to an open configuration, second end 75 of second anchoring structure 41 contacts a portion of second portion 50 of support structure 38 when support structure 38 is upright during use. When second end 75 of second anchoring structure 41 is hingedly pivotable to a closed orientation such as in FIGS. 15-20, second end 75 of second anchoring structure 41 is disconnected from contact with second portion 50 of collapsible support structure 38.

Figure 15:
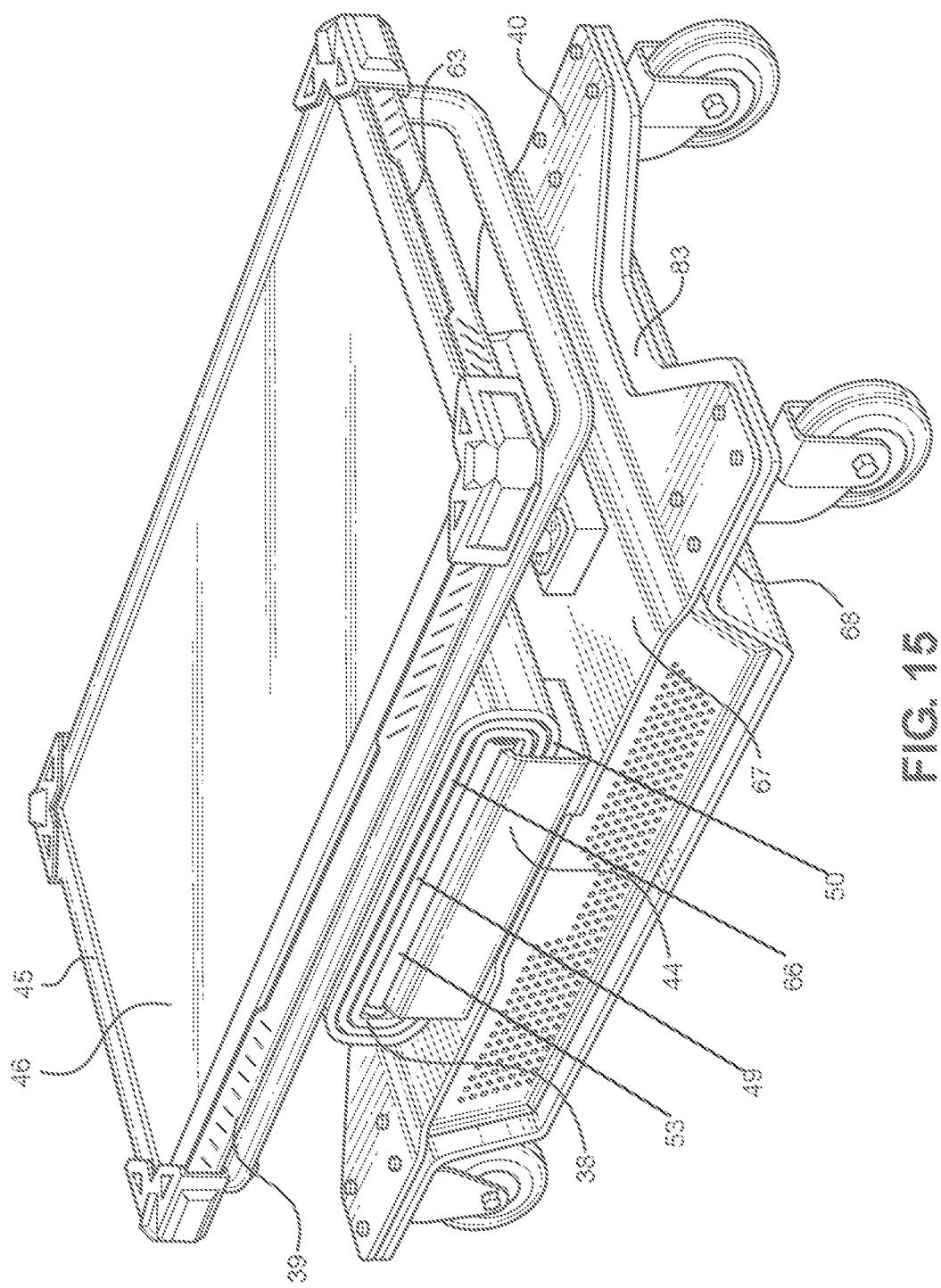
FIG. 15 is a top perspective view of an alternate embodiment of a novel support structure for an electronic device having a touch screen in a closed orientation with a pivotable handle connected to the base in a closed configuration.
Figure 16:
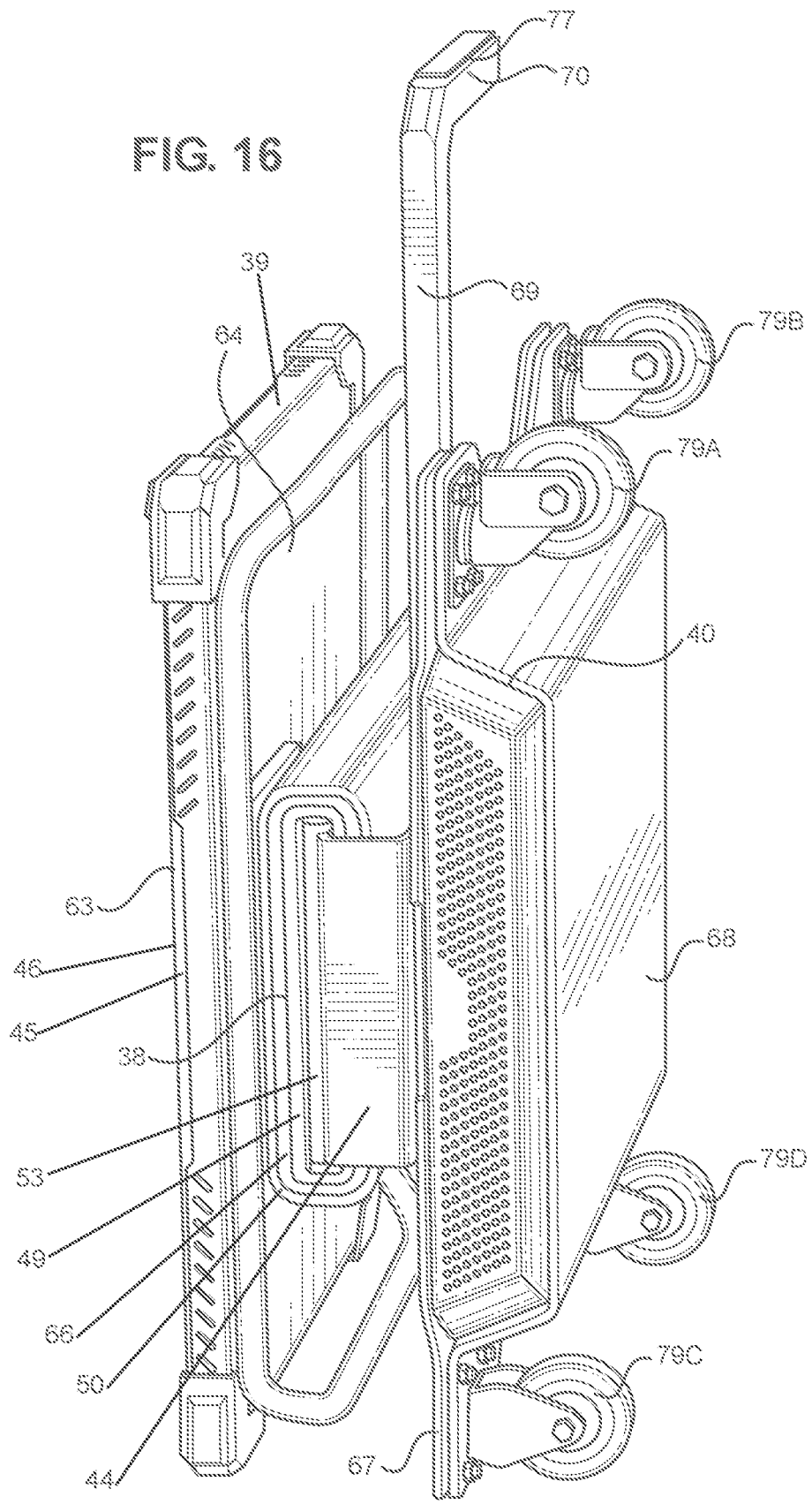
FIG. 16 is a side perspective view of an alternate embodiment of a novel support structure for an electronic device having a touch screen in a closed orientation with a pivotable handle connected to the base in an open configuration.

FIGS. 15, 16, 17, and 18 show L-bracket and/or protrusion 44 having a portion connected to base 40 and another portion connected to second portion 50 of collapsible support structure 38. FIGS. 15 and 16 best show first portion 49 of collapsible support structure is retained within second portion 50 of collapsible support structure 38 when in an unassembled or closed orientation. First portion 49 and second portion 50 of collapsible support structure 38 both overlay base 40 when in a closed orientation. Electronic device 45 overlays first portion 49 and second portion 50 of collapsible support structure 38 when oriented in a closed configuration.

Figure 18:
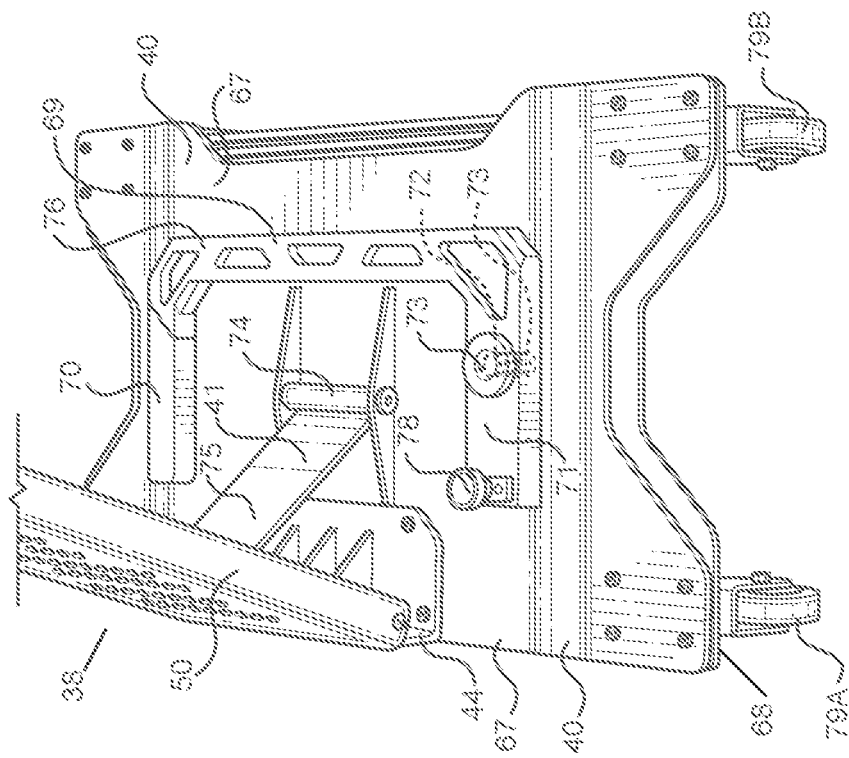
FIG. 18 is a partial view of an alternate embodiment of the base having a pivotable handle in a closed configuration.
Figure 17:
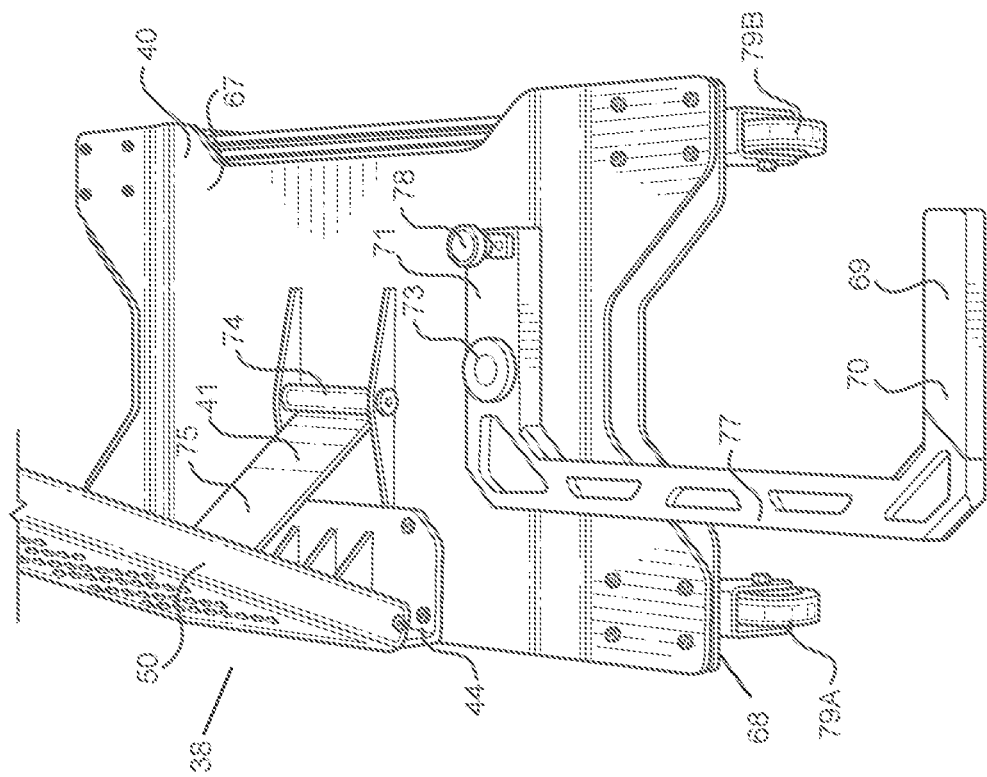
FIG. 17 is a partial view of an alternate embodiment of the base having a pivotable handle in an open configuration.

Referring now to FIGS. 16, 17, and 18, first side 67 of base 40 has handle 69. Handle 69 has first end 70 located opposite second end 71 (FIGS. 17 and 18). FIGS. 17 and 18 best show first end 70 of handle 69 is configured to be grasped by a user (not shown). Second end 71 of handle has opening 72 (FIG. 18) configured to receive fastener 73 such as a screw. Fastener 73 is configured to anchor handle 69 to base 40. Base 40 has first side 67 located opposite second side 68. Plurality of casters 79A and 79B are connected to second side 68 of base 40. FIG. 17 illustrates handle 69 positioned in an open configuration 77. Handle 69 can swivel at hinge point 73 being fastener 73. When handle 69 is positioned in an open configuration 77, at least a portion of handle 69 is oriented beyond the outer perimeter edge of base 40. When locking pin 78 is pulled out or released from base 40 at second end 71 of handle 69, handle 69 is free to pivot until an end of locking pin 78 is retained within an opening of the base 40 to restrict movement. Handle 69 allows a user to transport the collapsible support structure 38 easily, as it can be wheeled with plurality of casters 79A and 79B. FIG. 18 illustrates handle 69 oriented in closed position 76 when handle 69 does not overhand beyond outer perimeter edge of base 40.

Figure 20:
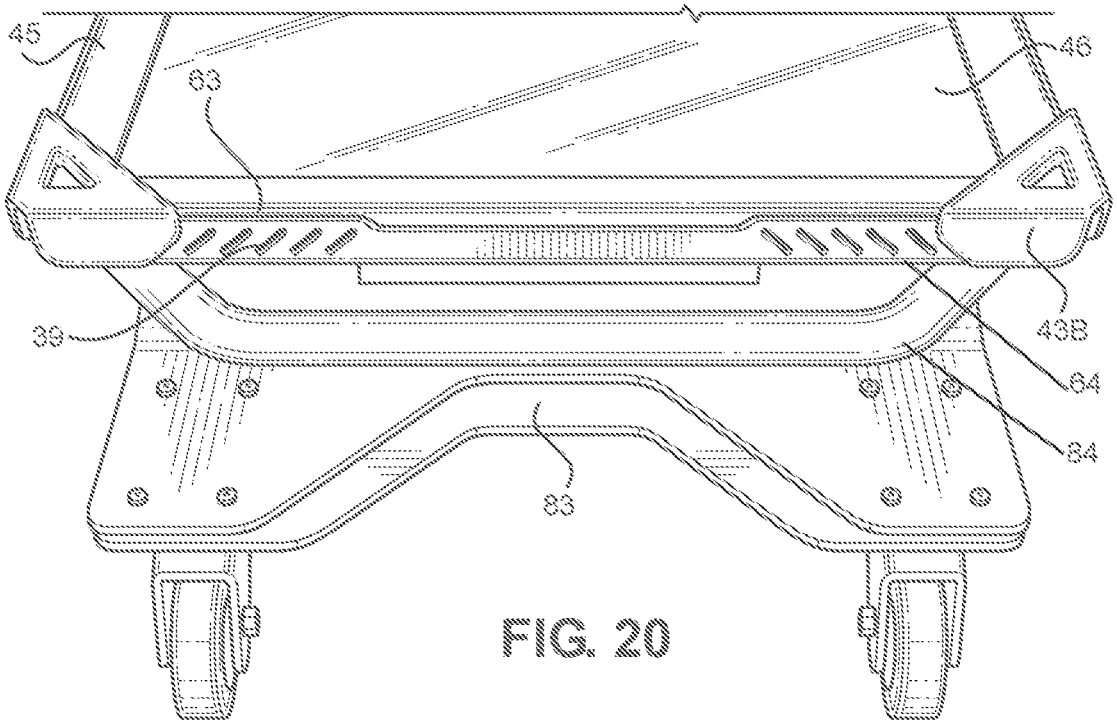

FIGS. 19 and 20 illustrate the corners of mounting bracket 39 retaining electronic device 45 having touch screen 46 being covered with barrier member 43A and 43B. In particular barrier member 43A and 43B overlay first side 63 and second side 64 of mounting bracket 39. FIG. 19 shows a first style of barrier element 43A having a plurality of protrusions 85 of a durable material capable of absorbing the force of an impact such as rubber or plastic. FIG. 20 shows a second style of barrier element 43B that only overlays first side 63 of mounting bracket 39 and does not have protrusions. Barrier members 43A and 43B are configured to connect to at least one corner of mounting bracket 39 to protect electronic device 45 from damage.

Figure 21:
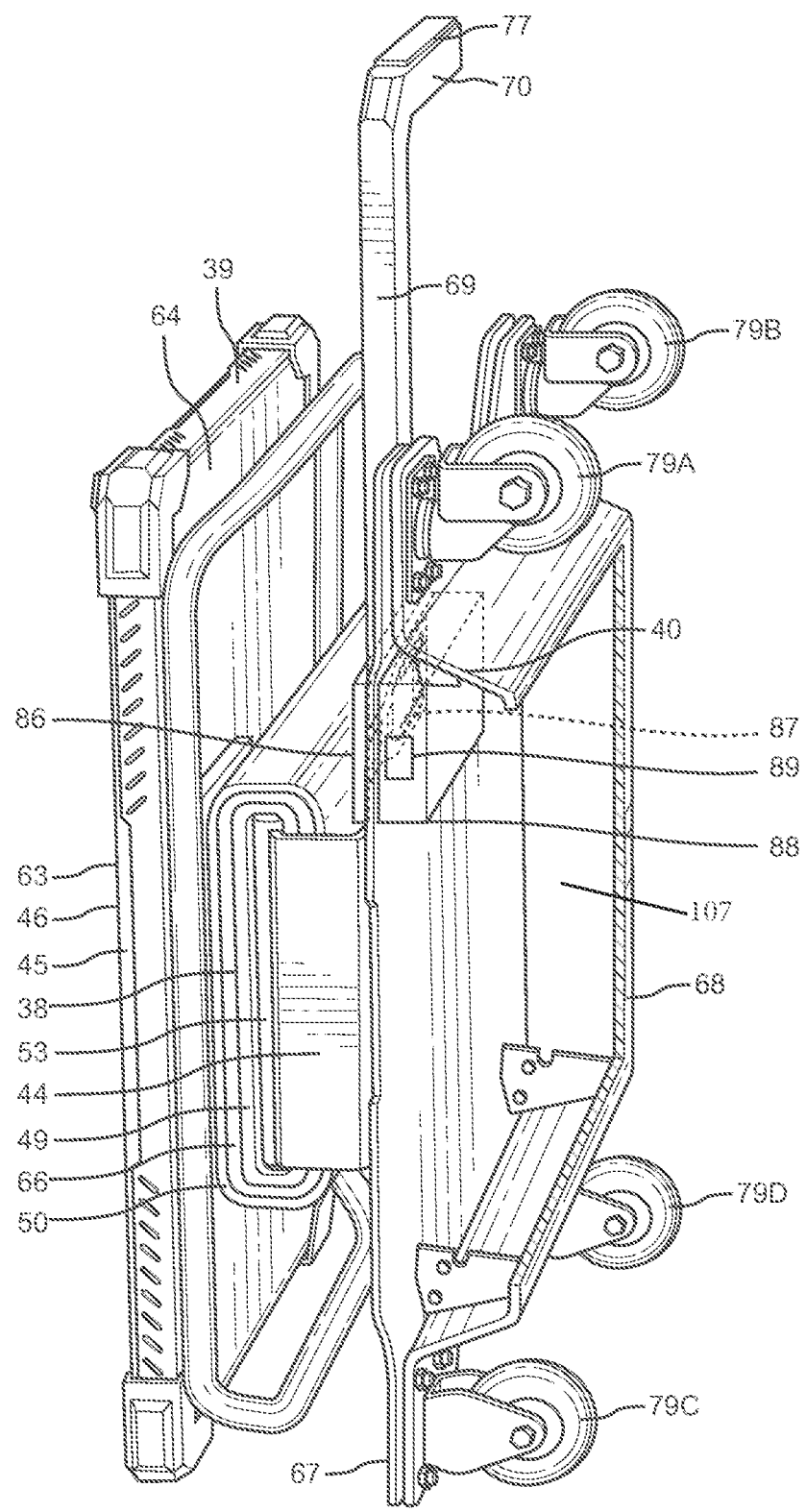
FIG. 21 is a side perspective view of an alternate embodiment of a novel support structure for an electronic device having a base with a removable battery and battery connection components.
Figure 22:
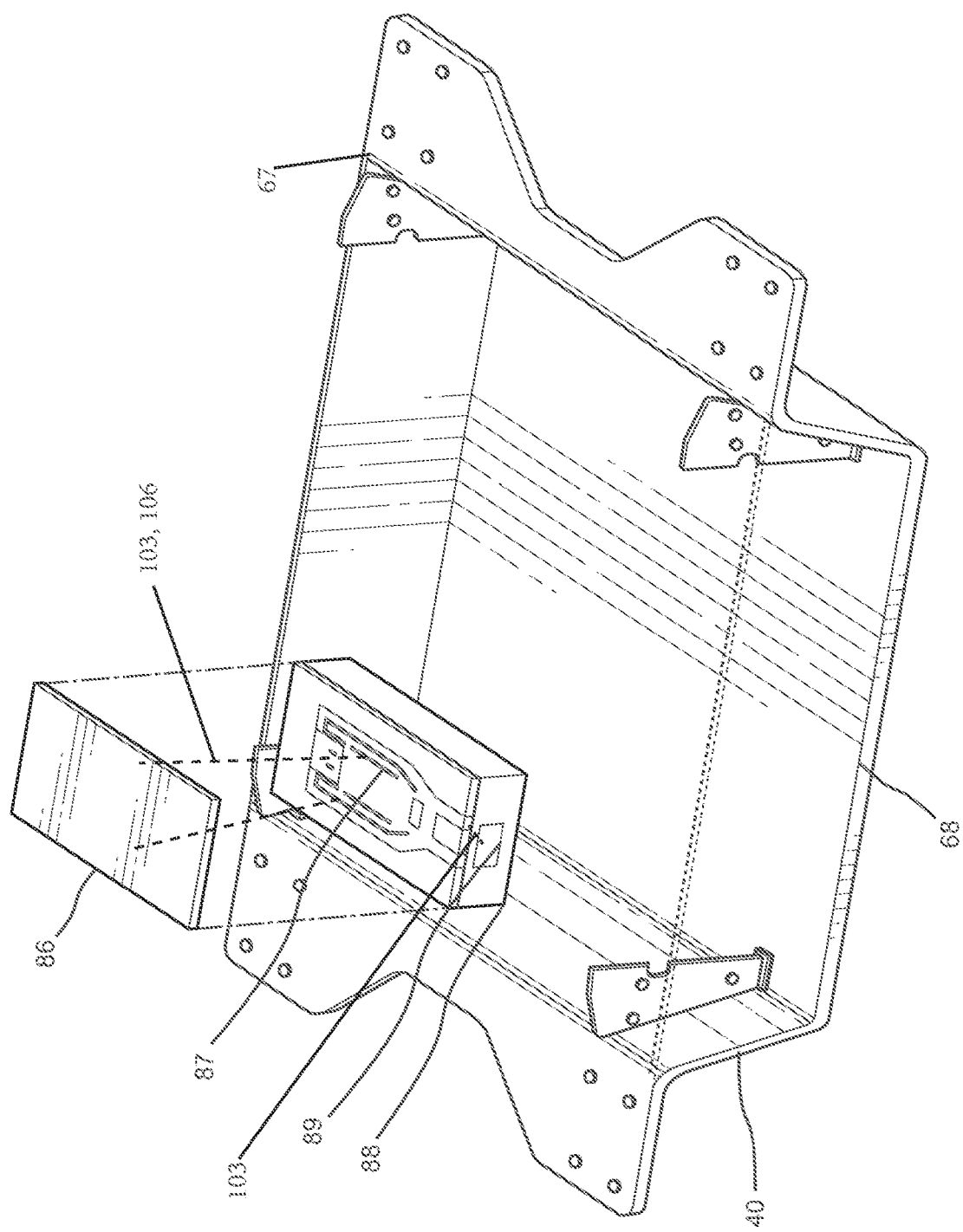
FIG. 22 is a top perspective view of an alternate embodiment of a novel support structure for an electronic device having a base with a removable battery and battery connection components.
Figure 24:
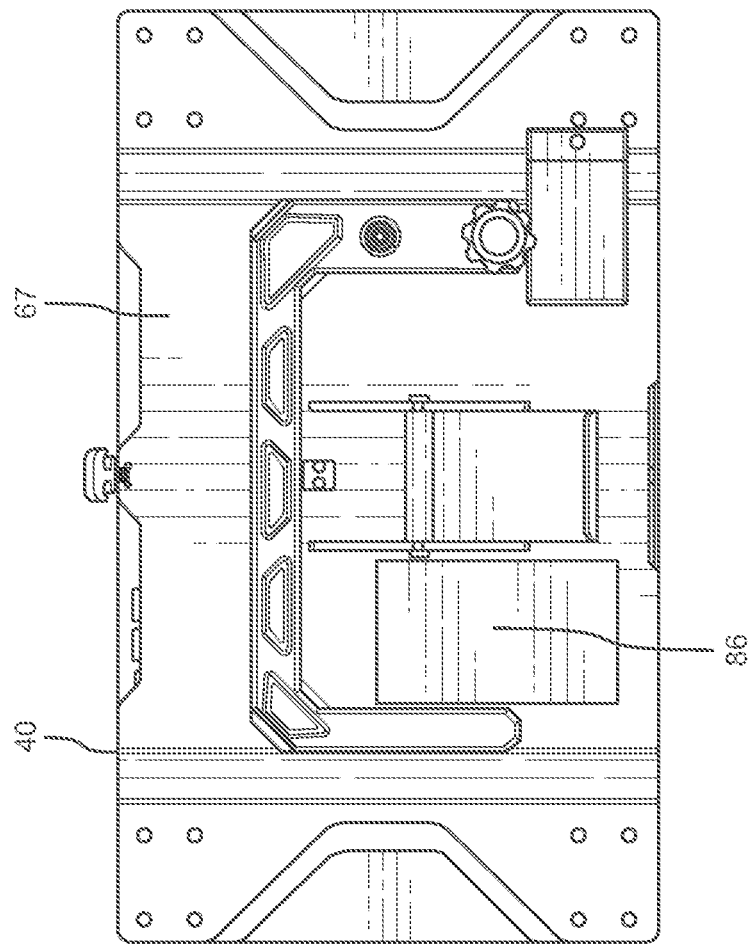
FIG. 24 is top view of an alternate embodiment of a novel base with a removable battery and battery connection components.
Figure 23:
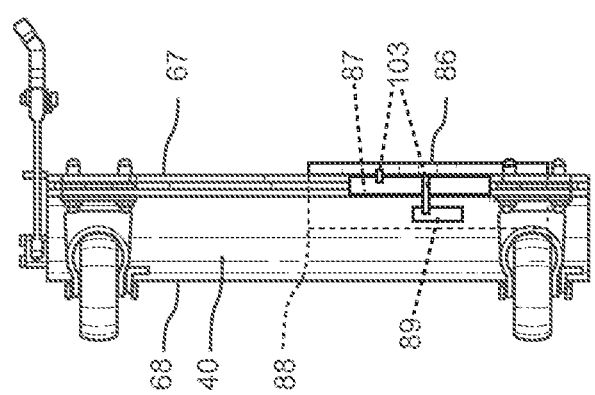
FIG. 23 is a side cut-away view of an alternate embodiment of a novel base with a removable battery and battery connection components.

FIGS. 21-23 show base 40 of collapsible support 38 (FIG. 21) of FIG. 16 having the power source being removable battery 86 removably connected to battery connection dock 87 of base 40. Battery 86 removably connects 106 (FIG. 22) to battery connection dock 87. Battery connection dock 87 has at least a portion located on first side 67 of base 40. Circuitry components 89 are retained in housing 88 in chamber 107 (FIG. 21) of base 40 located between first side 67 and second side 68 of base 40. Circuitry components 89 are electrically connected 103 (FIGS. 22 and 23) to battery connection dock 87 and battery connection dock 87 is electrically connected 103 (FIGS. 22 and 23) to removable battery 86. FIG. 24 shows battery 86 connected to first side 67 of base 40.

Figure 25:
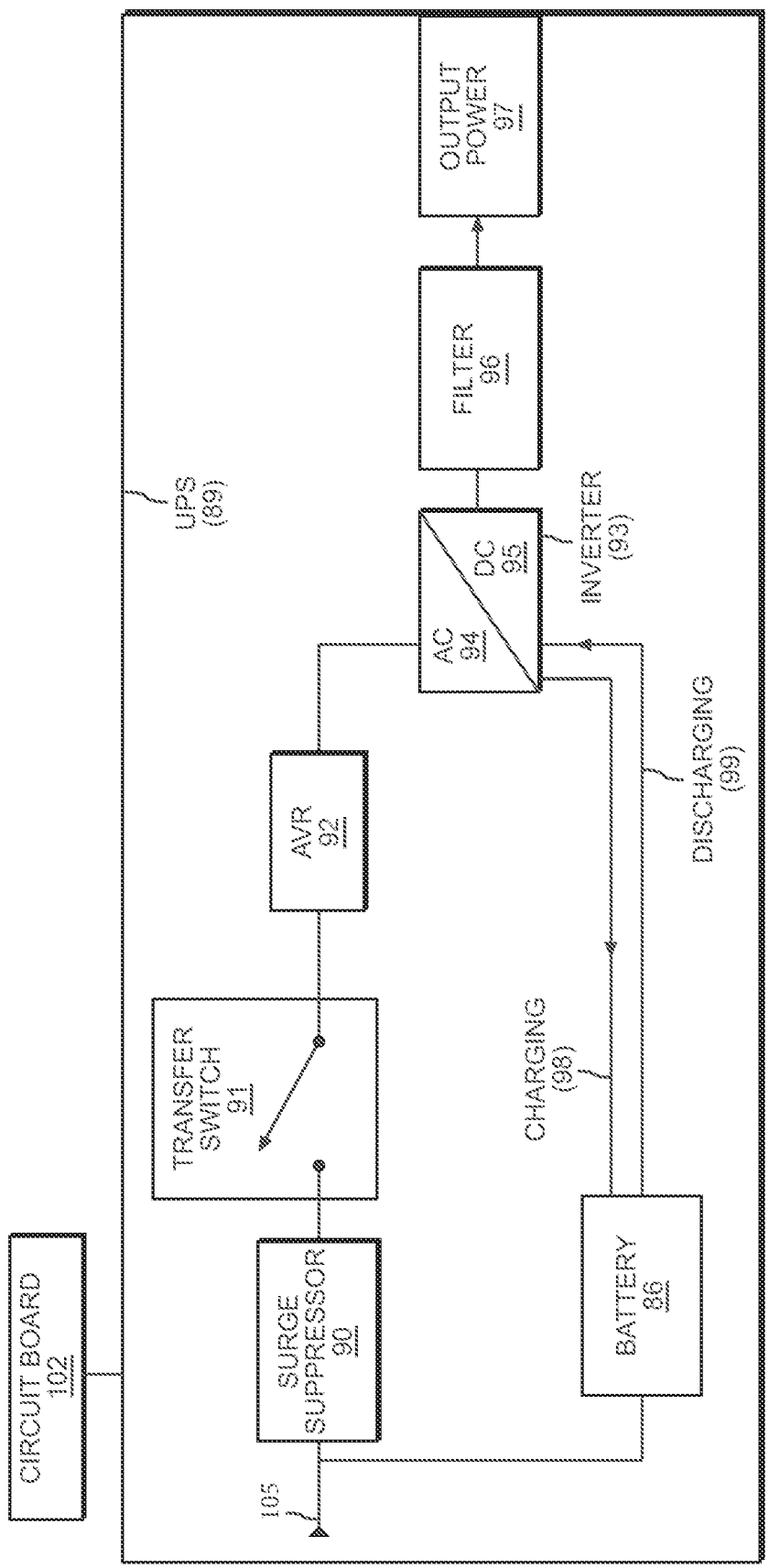
FIG. 25 is a block diagram of the novel line interactive UPS components of the battery system; and, FIG. 26 is a block diagram of the novel offline UPS components of the battery system.

FIG. 25 shows UPS circuitry 89 of a line interactive UPS having transfer switch 91 configured to open when power failure is detected to allow power from battery 86 to flow to the output power 97. Static bypass transfer switch 91 switches the UPS components off and allows power to pass when UPS failure is detected. Inverter 93 converts direct current (DC) 95 discharging 99 from battery 86 into ideal alternating current (94). This AC is then passed through filter 96 and results in output power 97 being fed to the load such as the electronic device. Battery 86 is charging 98 when AC (94) from inverter (93) is activated. Surge suppressor 90 is in electrical communication with transfer switch 91 and battery 86. Battery 86 is charged 98 by DC 95 from inverter 93. Automatic voltage regulator (AVR) 92 is in electrical communication with transfer switch 91 and inverter 93. When transfer switch 91 is oriented in a closed position. Main supply 105 passed through surge suppressor 90, through transfer switch 91, and through AVR 92, whereby, AC 94 is converted to DC 95 before passing through filter 96 to output power a load 97.

Figure 26:
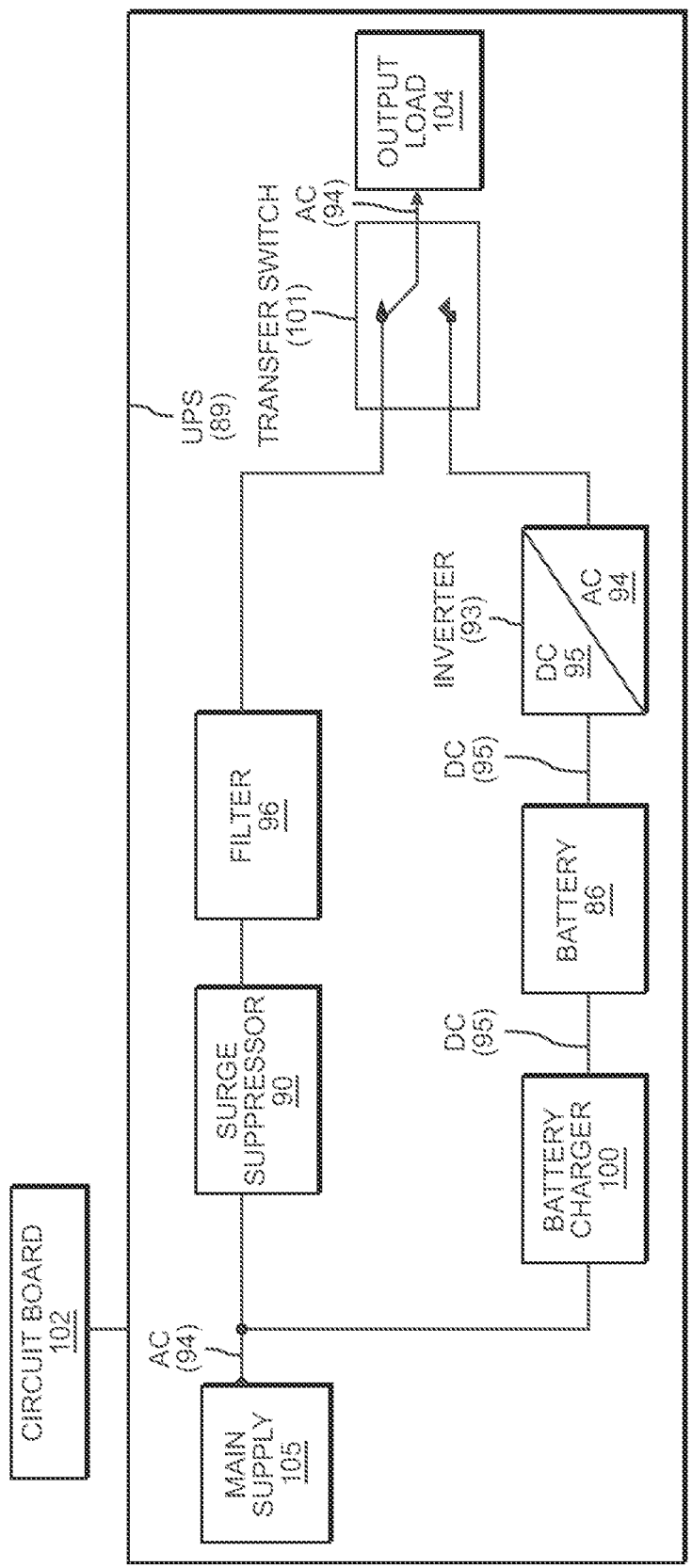

FIG. 26 shows UPS circuitry of an offline UPS configuration. UPS components may be located on circuit board 102 (FIGS. 25 and 26). Main supply 105 is routed to output load 104 through the relay. UPS 89 switches on inverter 93 when the system detects failure of main supply 105. When transfer switch 101 is closed in a first orientation, AC 94 power from main supply 105 to fed to surge suppressor 90 and then to filter 96 to output load 104. When transfer switch 101 is opened in a second orientation, AC 94 power from main supply 105 is transferred to battery charger 100 and DC 95 is transferred to battery 86 with DC 95 flowing to inverter 93 which converts DC 95 to AC 94 which is then routed to transfer switch 101.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now the invention has been described.

The invention claimed is:

1. A collapsible support structure for a removable electronic device, comprising:
   the electronic device, said electronic device having a touch screen;
   a mounting bracket, said mounting bracket having a first side located opposite a second side, said first side of said mounting bracket is configured to retain said electronic device, said second side of said mounting bracket having a first anchoring structure, said first anchoring structure is hingedly pivotable;
   a power source, said electronic device is in electrical communication with said power source, said power source is a removable battery;
   the collapsible support structure, said collapsible support structure having a first portion and a second portion, said first portion of said collapsible support structure having a first wall, said first wall having an opening configured to receive at least a portion of said first anchoring structure, said first wall is connected to a first side wall having a first flange located opposite a second side wall having a second flange, said first portion of said collapsible support structure having a first end located opposite a second end, said first end of said first portion of said collapsible support structure having a capturing structure connected to said mounting bracket of said electronic device, said second end of said first portion of said collapsible support structure having at least one opening located on said first flange and/or said second flange;
   said second portion of said collapsible support structure having a first end located opposite a second end, said first end of said second portion of said collapsible support structure having at least one locking pin, said first end of said second portion of said collapsible support structure receives said second end of said first portion of said collapsible support structure, said at least one locking pin of said second portion of said collapsible support structure is received by said at least one opening of said first flange and/or said second flange of said first portion of said collapsible support structure;
   a base, said base having a first side located opposite a second side, said first side of said base having a second anchoring structure, said second anchoring structure having a first end located opposite a second end, said second anchoring structure is hingedly pivotable at said first end, at least a portion of said second end of said second anchoring structure is connected to said second portion of said collapsible support structure, said first side of said base having a protrusion, said second portion of said collapsible support structure is hingedly connected to said protrusion of said base;
   a battery connection dock is connected to said base, said battery connection dock is electrically connected with said removable battery; and,
   said first portion of said collapsible support structure is retained within said second portion of said collapsible support structure when in an unassembled or closed orientation, said first portion and said second portion of said collapsible support structure both overlay said base when in said closed orientation, said electronic device overlays said first portion and said second portion of said collapsible support structure when oriented in said closed configuration.

2. The support structure of claim 1, further comprising: said first side of said base having a handle, said handle having a first end located opposite a second end, said first end of said handle is configured to be grasped by a user, said second end of said handle has an opening, said opening of said second end of said handle is configured to receive a fastener, said fastener is configured to anchor said handle to said base.

3. The support structure of claim 1, further comprising: said second side of said base is connected to a plurality of casters.

4. The support structure of claim 1, further comprising: said electronic device having at least one predetermined application, said at least one predetermined application is configured to be accessible to a user through a graphic user interface of said touch screen of said electronic device.

5. The support structure of claim 1, further comprising: said base having at least one radiused portion.

6. The support structure of claim 1, further comprising: said mounting bracket having a removable barrier member connected thereto, whereby, said removable barrier member is connected to at least one corner of said mounting bracket when said electronic device is retained within said mounting bracket.

7. The support structure of claim 1, further comprising: said base having a chamber, said chamber of said base retaining circuitry components, said circuitry components are electrically connected to said battery connection dock of said base.

8. The support structure of claim 7, further comprising: said circuitry components having an uninterruptable power supply.

9. The support structure of claim 8, further comprising: said uninterruptable power supply having an offline configuration.

10. The support structure of claim 8, further comprising: said uninterruptable power supply having a line interactive configuration.

11. A collapsible support structure for a removable electronic device, comprising:
- the electronic device, said electronic device having a touch screen;
- a mounting bracket, said mounting bracket having a first side located opposite a second side, said first side of said mounting bracket is configured to retain said electronic device, said second side of said mounting bracket having a first anchoring structure, said first anchoring structure is hingedly pivotable;
- a power source, said electronic device is in electrical communication with said power source, said power source is a removable battery;
- the collapsible support structure, said collapsible support structure having an end connected to said first anchoring structure, said collapsible support structure having another end connected to a base; and,
- a battery connection dock is connected to said base, said battery connection dock is configured to have an electrical connection with said removable battery.

12. The support structure of claim 11, further comprising: said base having a handle, said handle having a first end located opposite a second end, said first end of said handle is configured to be grasped by a user, said second end of said handle has an opening, said opening of said second end of said handle is configured to receive a fastener, said fastener is configured to anchor said handle to said base.

13. The support structure of claim 11, further comprising: said electronic device having at least one predetermined application, said at least one predetermined application is configured to be accessible to a user through a graphic user interface of said touch screen of said electronic device.

14. The support structure of claim 11, further comprising: said base having at least one radiused portion.

15. The support structure of claim 11, further comprising: said mounting bracket having a removable barrier member connected thereto, whereby, said removable barrier member is connected to at least one corner of said mounting bracket when said electronic device is retained within said mounting bracket.

16. The support structure of claim 11, further comprising: said base retaining circuitry components, said circuitry components are electrically connected to said battery connection dock of said base.

17. The support structure of claim 16, further comprising: said circuitry components having an uninterruptable power supply.

18. The support structure of claim 17, further comprising: said uninterruptable power supply having an offline configuration.

19. The support structure of claim 17, further comprising: said uninterruptable power supply having a line interactive configuration.

\* \* \* \* \*